(12) United States Patent
Schemmann et al.

(10) Patent No.: US 10,382,802 B1
(45) Date of Patent: Aug. 13, 2019

(54) ECHO CANCELLATION IN A BIDIRECTIONAL COMMUNICATION SYSTEM FOR OUT OF BAND SIGNALING TO A USER DEVICE

(71) Applicant: ARRIS Enterprises, Inc., Suwanee, GA (US)

(72) Inventors: Marcel F. Schemmann, Maria Hoop (NL); William P. Dawson, Manlius, NY (US); Derald Cummings, State College, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 117 days.

(21) Appl. No.: 14/462,995

(22) Filed: Aug. 19, 2014

Related U.S. Application Data

(60) Provisional application No. 61/867,259, filed on Aug. 19, 2013, provisional application No. 61/867,540, filed on Aug. 19, 2013.

(51) Int. Cl.
*H04N 21/238* (2011.01)
*H04B 1/10* (2006.01)
(Continued)

(52) U.S. Cl.
CPC ......... *H04N 21/238* (2013.01); *H04B 1/0475* (2013.01); *H04B 1/10* (2013.01);
(Continued)

(58) Field of Classification Search
CPC ...... H04N 7/17309; H04N 7/102; H04N 7/10; H04N 21/61; H04N 21/6118; H04N 17/004; H04N 21/2665; H04N 21/437; H04J 14/0282; H04J 14/0226; H04J 1/12; H04L 12/2856; H04L 25/03343; H04L 25/028; H04L 27/2691; H04L 5/0007; H04B 1/123; H04B 1/12; H04B 3/23; H04B 7/15585; H04B 3/32; H04M 11/062; H04M 9/082;
(Continued)

(56) References Cited

U.S. PATENT DOCUMENTS 5,581,555 A * 12/1996 Dubberly et al. ............ 370/487
5,604,528 A *  2/1997 Edwards et al. ............... 725/25
(Continued)

FOREIGN PATENT DOCUMENTS

WO  WO 03047251 A1 *  6/2003  ............. H04H 20/69

OTHER PUBLICATIONS

"Digital Video Broadcasting (DVB); Interaction Channel for Cable TV Distribution Systems (CATV)", European Telecommunications Standards Institute, Final Draft prETS 300 800: Jan. 1998, pp. 11-12.*
(Continued)

*Primary Examiner* — William J Kim
(74) *Attorney, Agent, or Firm* — Lori Anne D. Swanson

(57) ABSTRACT

Disclosed herein are techniques for bidirectional communication in a network, such as a cable television (CATV) system, for return band with echo cancellation. The techniques result in a minimum loss of available return bandwidth to facilitate forward out of band (OOB) communication to a client device, e.g., set top box (STB), within the extended return band, such as a return band extended beyond a frequency previously used for OOB communications.

15 Claims, 16 Drawing Sheets

(51) Int. Cl.
*H04N 21/2385* (2011.01)
*H04B 1/12* (2006.01)
*H04B 1/04* (2006.01)
*H04N 21/6338* (2011.01)
*H04N 21/647* (2011.01)
*H04N 21/24* (2011.01)
*H04N 21/222* (2011.01)

(52) U.S. Cl.
CPC ............... *H04B 1/12* (2013.01); *H04B 1/123* (2013.01); *H04N 21/2221* (2013.01); *H04N 21/2385* (2013.01); *H04N 21/2408* (2013.01); *H04N 21/6338* (2013.01); *H04N 21/6473* (2013.01)

(58) Field of Classification Search
CPC .......... H03F 1/0222; H04Q 2011/0009; H04Q 2011/0015
USPC .................. 348/E7.07; 398/66, 72, 67, 115; 725/131, 106, 125, 121
See application file for complete search history.

(56) References Cited

U.S. PATENT DOCUMENTS

| | | | | |
|---|---|---|---|---|
| 5,915,205 | A * | 6/1999 | Chen | H04N 7/17309 348/E7.052 |
| 6,069,899 | A * | 5/2000 | Foley | H04M 11/062 348/E7.05 |
| 6,091,932 | A | 7/2000 | Langlais | |
| 6,327,709 | B1 * | 12/2001 | Ovadia | H04L 25/03343 348/192 |
| 6,393,110 | B1 * | 5/2002 | Price | H04M 1/76 379/399.01 |
| 6,622,030 | B1 * | 9/2003 | Romesburg | H04B 3/23 379/406.01 |
| 7,016,308 | B1 | 3/2006 | Gallagher | |
| 7,184,664 | B2 | 2/2007 | Farmer et al. | |
| 9,209,898 | B1 | 12/2015 | Schemmann et al. | |
| 2002/0061012 | A1 * | 5/2002 | Thi | H04B 3/23 370/352 |
| 2002/0063924 | A1 * | 5/2002 | Kimbrough | H04B 10/272 398/79 |
| 2003/0112966 | A1 * | 6/2003 | Halder | H04B 3/23 379/406.05 |
| 2004/0107445 | A1 * | 6/2004 | Amit | H04L 12/2801 725/127 |
| 2005/0283815 | A1 * | 12/2005 | Brooks | H04H 20/78 725/126 |
| 2011/0025545 | A1 * | 2/2011 | Cook et al. | 342/22 |
| 2011/0061081 | A1 * | 3/2011 | Sarapin | 725/82 |
| 2012/0151548 | A1 | 6/2012 | Rakib | |
| 2013/0276047 | A1 * | 10/2013 | Chapman et al. | 725/111 |
| 2013/0332978 | A1 * | 12/2013 | Rakib | 725/127 |
| 2017/0237492 | A1 * | 8/2017 | Mutalik | H04B 10/2503 398/72 |

OTHER PUBLICATIONS

Dhanawan et al., "Adaptive Echo Canceller Based on Unbiased Adaptive IIR Notch Filter", 2008 International Conference on Computer and Electrical Engineering, pp. 886-889 (Year: 2008).*
Saurabh Chaudhury and Anirban Sengupta, "Designing a filter bank and an adaptive filtering technique to eliminate noises in power line communication", 2012 Power Engineering and Automation Conference, pp. 1-4 (Year: 2012).*
"Digital Broadband Delivery System: Out of Band Transport Part 1: Mode A", Society of Telecommunications Engineers, Engineering Committee, Digital Video Subcommittee, American National Standard, ANSI/SCTE 55-1 2009, 51 pgs.
"Digital Broadband Delivery System: Out of Band Transport Part 2: Mode B", Society of Telecommunications Engineers, Engineering Committee, Digital Video Subcommittee, American National Standard, ANSI/SCTE 55-2 2008, 70 pgs.
Notice of Allowance RE: U.S. Appl. No. 14/463,005, dated Oct. 5, 2015.

* cited by examiner

FORWARD RF BAND TYPICAL NUMBERS

| | | | |
|---|---|---|---|
| AMPLIFIER GAIN | 27 | dB | |
| OUTPUT LEVEL | 52 | dBmV/ch AT | 15 dB SLOPE |
| DISTORTION (CTB) | -55 | dBc | 750 MHz 15 dB SIGNAL TILT, HIGHEST/LOWEST FREQUENCY |
| FORWARD LOSS TO HOME | 46 | dB | -3 dBmV/6 MHz FORWARD AMP OUTPUT POWER DISTORTIONS |
| THERMAL ONLY CNR | 65.2 | INTO HOME | 6 dBmV/ch INTO HOME SIGNAL LEVEL |
| | | | -59.2 dBmV/4.2 MHz THERMAL NOISE FLOOR |

REVERSE RF BAND TYPICAL NUMBERS

| | | | |
|---|---|---|---|
| REVERSE BAND FREQ | 1000 | MHz | |
| REVERSE BANK BW | 150 | MHz | 50 dBmV/6 MHz MODEM OUTPUT |
| REVERSE BAND DATA | 1.0 | GBPS QAM 256 | 64.0 dBmV TOTAL |
| REVERSE LOSS TO HOME | 48.5 | dB | 45.1 dBmV/ch NTSC77 FLAT EQUIVALENT MODEM POWER |
| REVERSE COUPLER LOSS | 10 | dB | 1.5 dBmV/ch INTO AMPLIFIER |
| PRE-AMP NF | 7 | dB | -8.5 dBmV/ch INTO PRE-AMP |
| PRE-AMP SNR | 41.7 | | -57.2 dBmV/6.2 MHz THERMAL NOISE |
| | | | SUFFICIENT FOR QAM 256 |

DISTORTION REFLECTION ANALYSIS

| | | | |
|---|---|---|---|
| ISOLATION | 20 | dB AT OUT CPLR | -23 dBmV/ch DISTORTION DUE TO ISOLATION |
| PLANT REFLECTION | -12 | dB | -25 dBmV/ch DISTORTION DUE TO REFLECTION |
| REFLECTION ADD. RULE | 20 | dB | -17.9 dBmV/ch PEAK DISTORTION TOWARD PRE-AMP |
| PRE-AMP SDR | 9.4 | dB SDR | SDR: SIGNAL TO DISTORTION RATIO |

REFLECTION LEVEL ANALYSIS

| | | | |
|---|---|---|---|
| REVERSE AMP GAIN | 45 | dB | 26.5 dBmV/ch REVERSE POWER TO PREVIOUS AMPLIFIER |
| NETWORK REFLECTION | -12 | dB | 14.5 dBmV/ch REFLECTED POWER INTO FORWARD AMP |
| PRE-AMP SRR | -34.1 | dB SRR | 40.5 dBmV/ch FORWARD AMP OUTPUT POWER REFLECTED SIGNAL |
| SRR: SIGNAL REFLECTION RATIO | | | 25.6 dBmV/ch PEAK REFLECTION TOWARD PRE-AMP |
| LOOP GAIN | 34.1 | dB | |

Spectrum (left to right):
- 1304: 5-42 MHz DOCSIS RETURN
- 1302: 42-54 MHz X-OVER
- 55-750 MHz ANALOG AND DOCSIS
- 750-850 MHz OFDM FORWARD
- 1302: 850-950 MHz X-OVER
- 1304: 950-1050 MHz OFDM RETURN

FIG. 13B

- 1304: 5-42 MHz DOCSIS RETURN
- 1302: 42-54 MHz X-OVER
- 55-750 MHz ANALOG AND DOCSIS
- 1310: 750-890 MHz OFDM FORWARD
- 1314: 920-950 MHz OFDM RETURN
- 1312: 920-1050 MHz OFDM RETURN

FIG. 13C

- 1304: 5-42 MHz DOCSIS RETURN
- 1302: 42-54 MHz X-OVER
- 55-750 MHz ANALOG AND DOCSIS
- 1322: 750-830 MHz OFDM RETURN
- 1320: 830-1050 MHz OFDM BIDIRECTIONAL

ECHO CANCELLATION IN A BIDIRECTIONAL COMMUNICATION SYSTEM FOR OUT OF BAND SIGNALING TO A USER DEVICE

CROSS-REFERENCES TO RELATED APPLICATIONS

The present disclosure claims priority to U.S. Provisional App. No. 61/867,259, entitled "BIDIRECTIONAL COMMUNICATION IN A CABLE TELEVISION RETURN", filed Aug. 19, 2013, and U.S. Provisional App. No. 61/867,540, entitled "BIDIRECTIONAL COMMUNICATION IN A CABLE TELEVISION RETURN", filed Aug. 19, 2013, the contents of which is incorporated herein by reference in its entirety.

BACKGROUND

A cable television (CATV) system may provide media content, such as video, data, voice, or high-speed Internet services, for example, to subscribers. The cable television system may deliver the media content from a headend to subscriber's client devices over an existing cable television network. The cable television network can take the form of an all-coax, all-fiber, or hybrid fiber/coax (HFC) network.

To keep pace with increasing customer demands for media content and the corresponding explosion in demands for bandwidth, cable television (CATV) systems are seeking solutions for increasing the bandwidth available for upstream and downstream communications. Proposals include extending the upper boundary of the return band frequency by extending the split between the return band and the forward band to allocate more bandwidth to the upstream channel. However, reallocating spectrum to the upstream path means consuming a portion of the spectrum currently dedicated to the downstream path. Increasing the upper boundary of the return band frequency may interfere with CATV components that require transmitting downstream communication signals in the downstream path that fall within the frequency reallocated to the return band.

Further, the cable industry is contemplating adding bidirectional high-speed data services to cable networks to supplement/upgrade existing DOCSIS systems. Such networks may implement Ethernet over coax aiming to offer 1 gigabit per second (Gbps) bidirectional data capacity. However, current solutions require transmission powers that are very high, are problematic to achieve for home-based modems, and/or are costly to support in an amplifier chain.

Proposals to migrate to an advanced DOCSIS system that add bidirectional high speed data services, while retaining existing DOCSIS and video services, require the use of unused spectrum. However, the usable frequency spectrum on cable is limited due to suckouts (e.g., narrow frequency notches with high attenuation) caused by splitters/combiners/amplifier housings and plant maintenance issues. To make use of the limited amount of spectrum, an increased number of bps/Hz in the occupied bandwidth has been proposed to support a 1 Gbps bidirectional data capacity. However, adequate signal to noise ratios are difficult to achieve at high frequencies where cable losses are high.

BRIEF DESCRIPTION OF THE DRAWINGS

FIG. 9 depicts a table with the relevant numbers for the illustration in FIG. 8.

FIG. 13A represents a spectrum for a conventional top-split architecture

FIG. 13B represents spectrum allocation using reverse regenerator including echo cancellation techniques according to one embodiment.

FIG. 13C represents spectrum allocation with a system with bi-directional regenerator according to one embodiment.

DETAILED DESCRIPTION

Described herein are techniques for echo cancellation in a communication system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Disclosed herein are techniques for bidirectional communication in a network, such as a cable television (CATV) system, return band with echo cancellation. The techniques result in a minimum loss of available return bandwidth to facilitate forward out of band (OOB) communication to a client device, e.g., set top box (STB), within the return band.

Further, disclosed are embodiments for a full or partial elimination of a diplexer in the communication system. Embodiments disclosed include techniques for avoiding the loss of usable frequency spectrum to reduce the bps/Hz efficiency needed in a bidirectional high bitrate system.

System Overview

Figure 1:
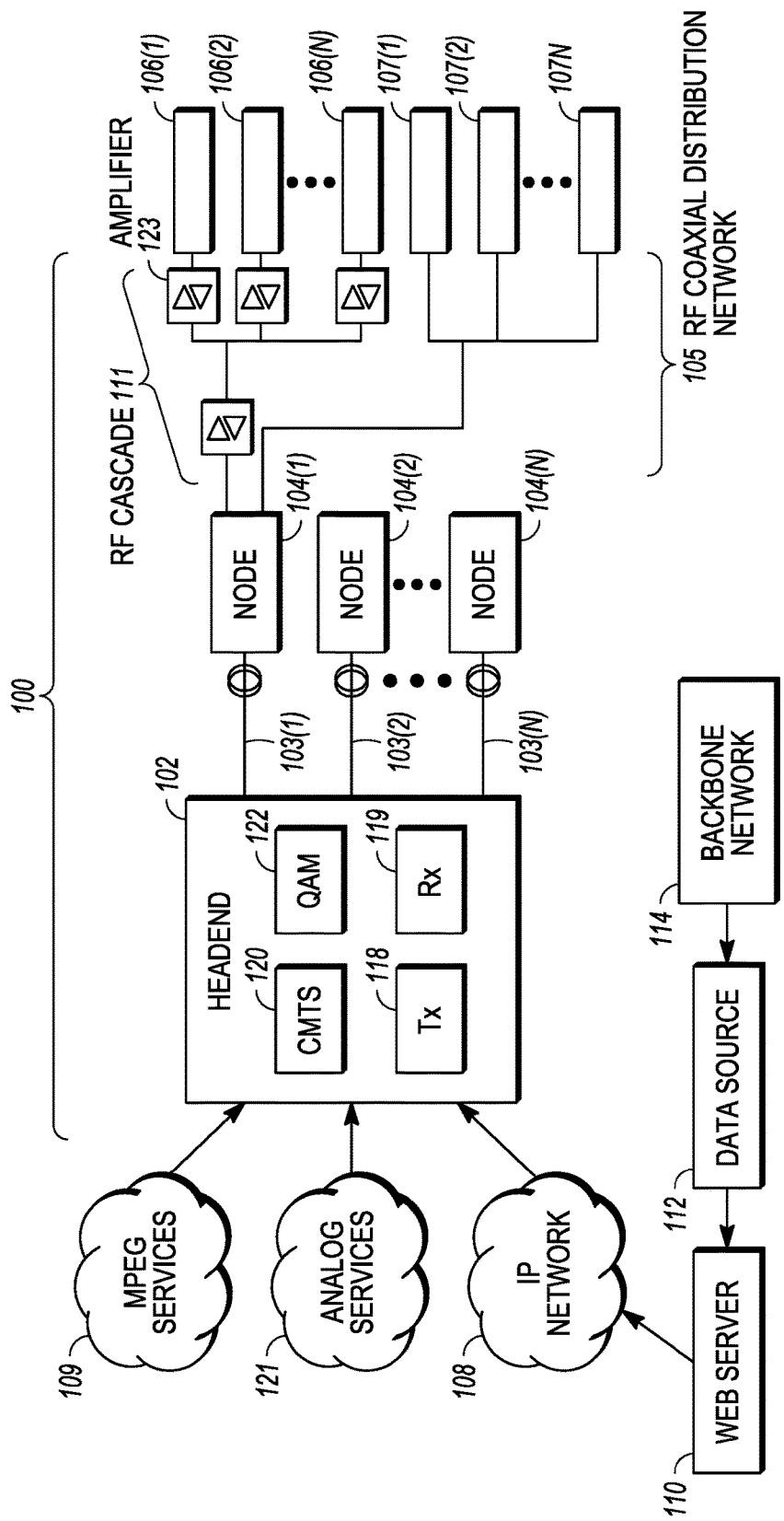
FIG. 1 illustrates an example cable television (CATV) system capable of delivering high-definition digital entertainment and telecommunications such as video, voice, and high-speed Internet services.

FIG. 1 illustrates an example cable television (CATV) system 100 capable of delivering high-definition digital entertainment and telecommunications such as video, voice, and high-speed Internet services. Generally speaking, the CATV system 100 refers to the operational (e.g., geographical) footprint of an entertainment and/or information services franchise that provides entertainment and/or information services to a subscriber base spanning one or more towns, a region, or a portion thereof. Particular entertainment and/or information services offered by the franchise (e.g., entertainment channel lineup, data packages, etc.) may differ from system to system. Some large cable companies operate several cable communication systems (e.g., in some cases up to hundreds of systems), and are known generally as Multiple System Operators (MSOs). Although a cable network is described, other networks may be used.

The cable network can take the form of an all-coax, all-fiber, or hybrid fiber/coax (HFC) network. For purposes of illustration, FIG. 1 depicts a hybrid fiber-coaxial (HFC) network. An HFC network is a broadband network that combines optical fiber and coaxial cable, strategically placing fiber nodes to provide services to a plurality of homes. It should be realized that the disclosed techniques may be employed in various networks and the HFC network is merely shown as a non-limiting example.

The network shown in FIG. 1 is a HFC broadband network that combines the use of optical fiber and coaxial connections. The network includes a headend 102 that receives analog video signals and digital bit streams representing various services (e.g., video, voice, and Internet) from various digital information sources. For example, the Headend may receive content from one or more video on demand (VOD) servers, IPTV broadcast video servers, Internet video sources, or other suitable sources for providing Internet Protocol (IP) content.

FIG. 1 includes an IP network 108, MPEG services 109, and analog services 121. The IP network 108 includes a web server 110, and a data source 112. The web server 110 is a streaming server that uses IP to deliver video-on-demand, audio-on-demand, and pay-per view streams to the IP network 108. The IP data source 112 may be connected to a regional area or backbone network 114 that transmits Internet Protocol. For example, the regional area network can be or include the Internet or an IP-based network, a computer network, a web-based network or other suitable wired or wireless network or network system.

At the headend 102, the various services are encoded, modulated and up-converted onto radio frequency (RF) carriers, combined onto a single electrical signal and inserted into a broadband optical transmitter (Tx) 118. A fiber optic network 103 extends from the cable operator's master/regional headend 102 to a plurality of fiber optic nodes 104(1) . . . 104(n). The headend 102 may contain an optical transceiver (optical transmitter 118 and optical return receiver (Rx) 119) to send and receive optical communications through the optical fibers 103. Regional headends and/or neighborhood hub sites may also exist between the headend and one or more nodes. The fiber optic portion 103 of the example HFC network extends from the headend to the regional headend/hub and/or to a plurality of nodes 104(1)-(n). The optical transmitter 118 converts the electrical signal to a downstream optically modulated signal that is sent to the nodes 104. In turn, the optical nodes 104 convert inbound (forward) optical signals to Radio Frequency (RF) energy for network elements 106. In the return path, optical nodes 104 convert return RF signals to optical signals, and send the optical signals through optical network 103 to return receiver 119, which can convert the optical signals back to electrical signals. In one example, a node is a local digital hub that transports local requests over the optical network and back to the customer home via the coaxial cables.

Each of the nodes (104a-n) serves a service group made up of one or more customer locations. By way of example, a single node 104(1) may be connected to thousands of cable modems or other network elements 106. In an example, a fiber node 104 serves anywhere from 1 to 2000 customer locations. In an HFC network, the fiber optic node 104 may be connected to a plurality of client devices 106 via a coaxial cable portion 105 or a combined fiber optic/coaxial cable portion 105 of the network. In implementations, each node 104 may include a broadband optical receiver to convert the downstream optically modulated signal received from the headend/hub to an electrical signal provided to the subscribers' network elements 106(1) . . . 106(n) via a coaxial portion 105 of the HFC network. Each node 106 may be connected to many network elements 102 of subscribers via a coaxial cable portion of the network represented by the RF cascade 103. Signals may pass from the node 104 to the client devices 106, 107 via the RF cascade 111, which may be comprised of multiple amplifiers 123 and active or passive devices including cabling, taps, splitters, and in-line equalizers. In one example, client devices 106 may be connected via amplifiers 123, and client devices 107 do not have signals amplified in network 105. The tap is the customer's drop interface to the coaxial system. Taps are designed in various values to allow amplitude consistency along the distribution system.

The client devices 106 may reside at a customer location, such as a home of a cable subscriber, and are connected to the cable modem termination system (CMTS) 120 or comparable component located in a headend. A client device 106 may be a modem, e.g., cable modem, MTA (media terminal adaptor), set top box, terminal device, television equipped with set top box, Data Over Cable Service Interface Specification (DOCSIS) terminal device, customer premises equipment (CPE), router, or like electronic client, end, or terminal devices of subscribers. For example, cable modems and IP set top boxes may support data connection to the Internet and other computer networks via the cable network, and the cable network provides bi-directional communication systems in which data can be sent downstream from the headend 102 to a subscriber and upstream from a subscriber to the headend 102.

The techniques disclosed herein may be applied to systems compliant with DOCSIS. The cable industry developed the international Data Over Cable System Interface Specification (DOCSIS®) protocol to enable the delivery of IP data packets over cable systems. In general, DOCSIS defines the communications and operations support interface requirements for a data over cable system. For example, DOCSIS defines the interface requirements for cable modems involved in high-speed data distribution over cable television system networks. However, it should be understood that the techniques disclosed herein may apply to any system for digital services transmission, such as digital video or Ethernet Protocol over Coax. Examples herein referring to DOCSIS are illustrative and representative of the application of the techniques to a broad range of services carried over coax.

References are made herein to a Cable Modem Termination System (CMTS) in the headend 102, also developed by the cable industry. In general, the CMTS is a component located at the headend or hub site of the network that exchanges signals between the headend and client devices within the cable network infrastructure. In an example DOCSIS arrangement, for instance, the CMTS and the cable modem may be the endpoints of the DOCSIS protocol, with the hybrid fiber coax (HFC) cable plant there between. It will be appreciated that system 100 includes one CMTS for illustration clarity only-indeed, it is customary that multiple CMTS units and their CMs are managed through the management network.

The CMTS 120 hosts downstream and upstream ports and contains numerous receivers, each receiver handling communications between hundreds of end user network elements connected to the broadband network. For example, each CMTS 120 receiver may be connected to several modems of many subscribers, e.g., a single receiver may be connected to hundreds of modems which vary widely in communication characteristics. In many instances several nodes, such as fiber optic nodes 104(1), may serve a particular area of a town or city. DOCSIS enables IP packets to pass between devices on either side of the link between the CMTS and the cable modem.

Traffic transferred from the headend 102 to a receiving device 106(1) . . . 106(n) can be said to travel in a downstream direction; conversely, traffic transferred from a receiving device 106(1) . . . 106(n) to the headend 102 can be said to travel in an upstream direction. Downstream (also referred to as forward path) optical communications over the optical fiber 103 are typically converted at the nodes 104 to Radio Frequency (RF) communications for transmission over the coaxial cable in network 105. Conversely, upstream (also referred to as return path) RF communications from the network elements are provided over the coaxial cables in network 105 and are typically converted at nodes 104 to optical communications for transmission over the optical fiber 103 to the headend 102. Each node 104 may contain a reverse/return path transmitter that is able to relay communications upstream from a subscriber network element 106 to the headend 102.

It should be understood that the CMTS is a non-limiting example of a component in the cable network that may be used to exchange signals between the headend and client devices within the cable network infrastructure. For example, other non-limiting examples include the Modular CMTS (M-CMTS™) architecture, a Converged Cable Access Platform (CCAP), or a STB control system.

An EdgeQAM (EQAM) or EQAM modulator may be in the headend or hub device for receiving packets of digital content, such as video or data, re-packetizing the digital content into an MPEG transport stream, and digitally modulating the digital transport stream onto a downstream RF carrier using Quadrature Amplitude Modulation (QAM). Edge QAMs may be used for both digital broadcast, and DOCSIS downstream transmission. In CMTS or M-CMTS implementations, data and video QAMs may be implemented on separately managed and controlled platforms. In CCAP implementations, the CMTS and edge QAM functionality may be combined in one hardware solution, thereby combining data and video delivery.

Orthogonal frequency-division multiplexing (OFDM) may utilize a multitude of lower amplitude subcarriers (compared to single carrier QAM signals). For example, while a conventional DOCSIS QAM carrier is 6 MHz wide in the USA (7 MHz or 8 MHz in Europe), the CATV system may employ orthogonal frequency division multiplexing (OFDM) technology with OFDM carriers that are approximately 25 kHz to 50 kHz wide. Thus, where previously 100 QAM carriers were used, thousands of OFDM subcarriers may be used. OFDM technology may be suitable for noisy signal conditions and may enable the use of more of the available spectrum without reducing the quality of service. In example implementations, a cable network may use QAM modulation for relatively high downstream speeds and significantly boost upstream speeds using OFDM, even with reduced return bandwidth.

I. System to Extend the Return Band

As the CATV infrastructure evolves, the upper boundary of the return band frequency in a CATV system may be extended by increasing the frequency of the split between the return band and the forward band; this allocates more bandwidth to the upstream channel. Extending the return band may enable high complexity modulation to be used for efficient high speed data transport in the return path. However, reallocating spectrum to the upstream means consuming a portion of the spectrum currently dedicated to the downstream path. Thus, increasing the upper boundary of the return band frequency may interfere with CATV components that require transmitting downstream communication signals in the forward path that fall within the frequency reallocated to the return band. In this case, many legacy components may need to be replaced to transmit in different frequency bands resulting in a large expense for system operators.

In an example DOCSIS implementation described for purposes of illustration, consider implementations in which the return band is extended from 42 MHz or 65 MHz to approximately 200 MHz (called high-split), or higher. There may be a significant population of devices, such as set top boxes, that require forward path out of band (OOB) communication signals in the forward path below 200 MHz, a portion of the spectrum that is now reallocated to the return band. The OOB communication signals may be control signals for the set top boxes. Thus, increasing the upper boundary of the return band frequency to 200 MHz may interfere with the set top boxes that receive downstream communication signals below 200 MHz and cannot be retuned. For example, out of band signals are used for one-way or two-way communication with set top boxes. The receivers for the out of band signals for a set top box are normally tuned to 70-130 MHz, and typically the legacy downstream out of band STB control channel is located at 75 MHz. Thus, if the frequencies on the upstream cable plant are extended, the downstream out of band receivers that are currently located in the high-split upstream signal band, will not work. That is, the legacy downstream out of band control channel interferes with the high-split upstream spectrum concept.

The costs to facilitate out of band communications represents a barrier to expanding DOCSIS bandwidth and deters further use of a DOCSIS compliant system. Replacing all out of band devices, such as set top boxes, prior to a migration to an advanced DOCSIS system may be logistically (and financially) undesirable. Facilitating downstream out of band (OOB) communication signals may require costly modifications, such as modifying amplifiers with filters and crossover bands that sacrifice a large amount of return bandwidth. For example, a separation between forward communication of OOB signals in a frequency band that is otherwise used for return communication may be achieved by adding directional couplers, triplex or notch filters and analog amplification. However, this puts very stringent requirements on the amplifiers and leads to a loss of available return bandwidth at the OOB communication frequencies. It furthermore leads to an excessive loss in reverse communication bandwidth due to implementation limits of the required filters.

Cost-effective solutions are desirable to facilitate out of band communication in an advanced DOCSIS environment. Even if legacy set top boxes are eventually modified or replaced, deployment of out of band devices may be desirable during migration to a modified architecture. Thus, solutions are desirable that allow the cable plant, e.g., a HFC plant, to be migrated to advanced DOCSIS without requiring a full scale replacement of subscriber equipment.

Echo Cancellation Techniques in Return Band

Disclosed herein are techniques for injecting legacy out of band signals in to the CATV system by adding one or more active regenerators or frequency converters at amplifiers and/or nodes in a high-split architecture. As used herein, legacy out of band signals include those that fall within a frequency previously dedicated to downstream communication but reallocated to upstream communication. In embodiments, out of band signaling is injected in the downstream direction. In embodiments, the out of band signal injection is achieved without the use of notch filters in the amplifiers. In embodiments, the disclosed techniques may either rely on analog methods to suppress signal propagation in an unwanted direction or use digital methods without diplexer filters. However, it should be understood that filters may be used, e.g., filters with relaxed specifications may simplify some implementations.

Figure 2:
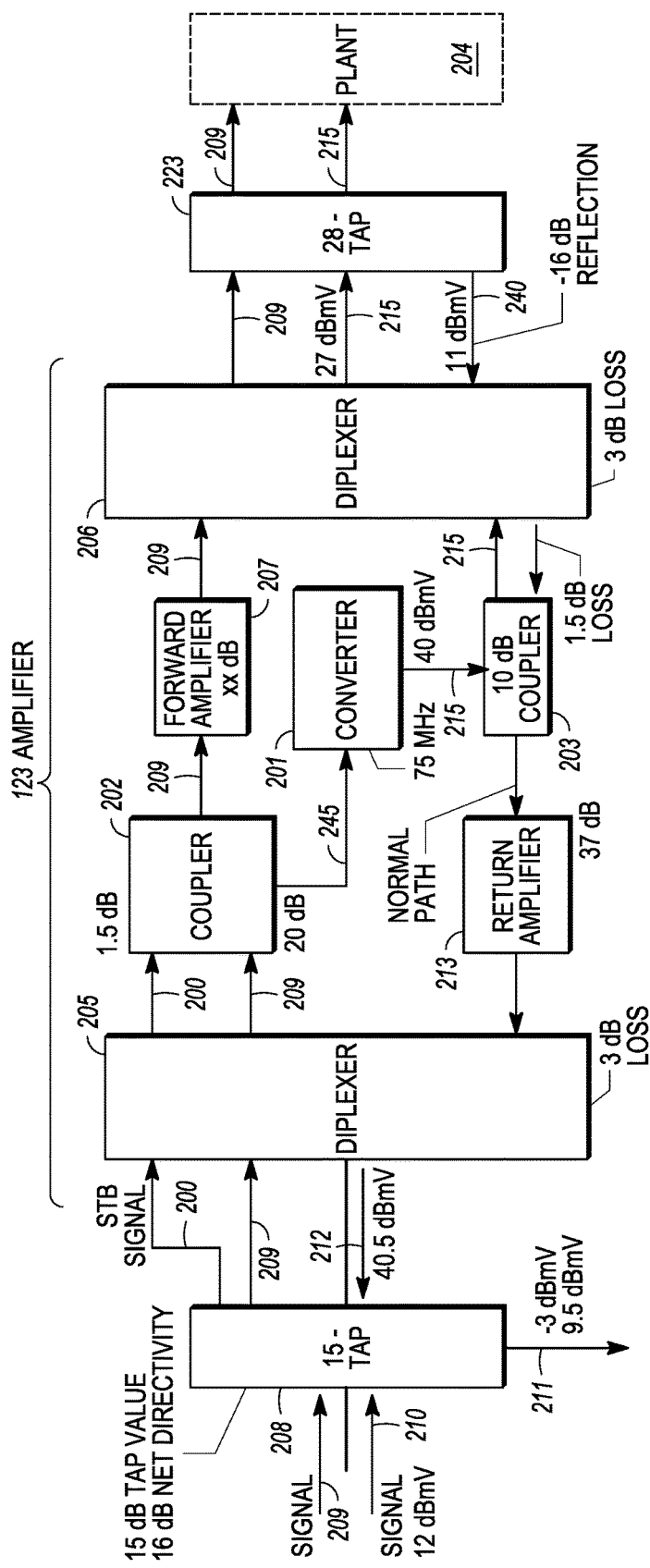
FIG. 2 illustrates the technical problems associated with simply adding a converter to an amplifier that does not prevent the upstream amplification of reflected signals from the OOB STB signals.
Figure 3A:
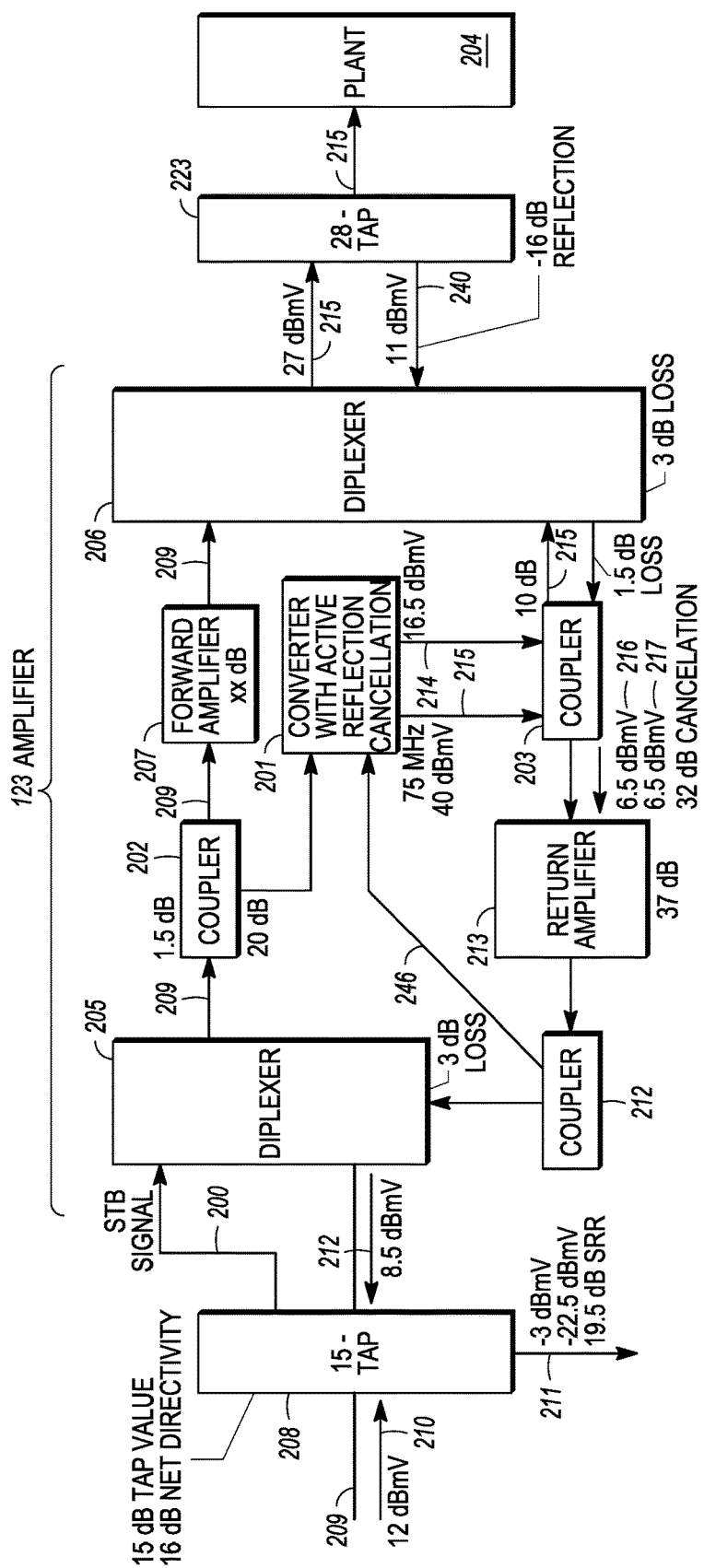
FIG. 3A depicts an example of the amplifier from FIG. 2 but with active cancellation according to one embodiment.
Figure 3B:
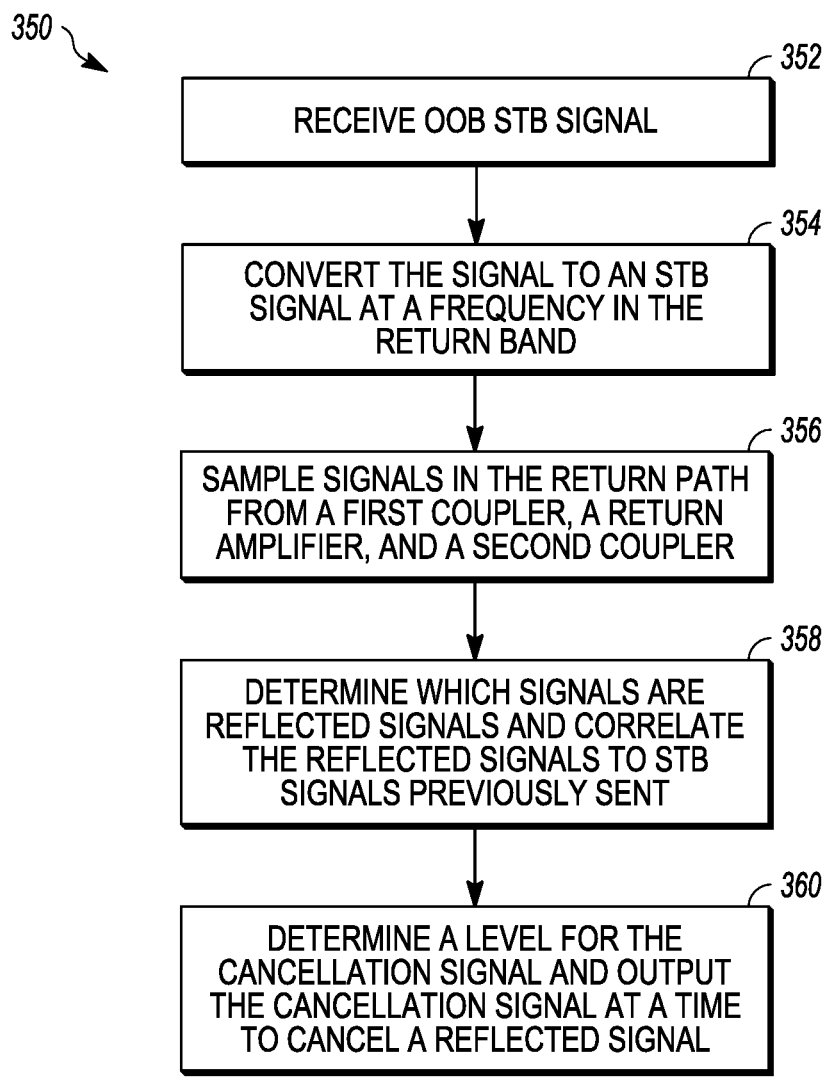
FIG. 3B depicts a simplified flowchart of a method for active cancellation of signals according to one embodiment.
Figure 4A:
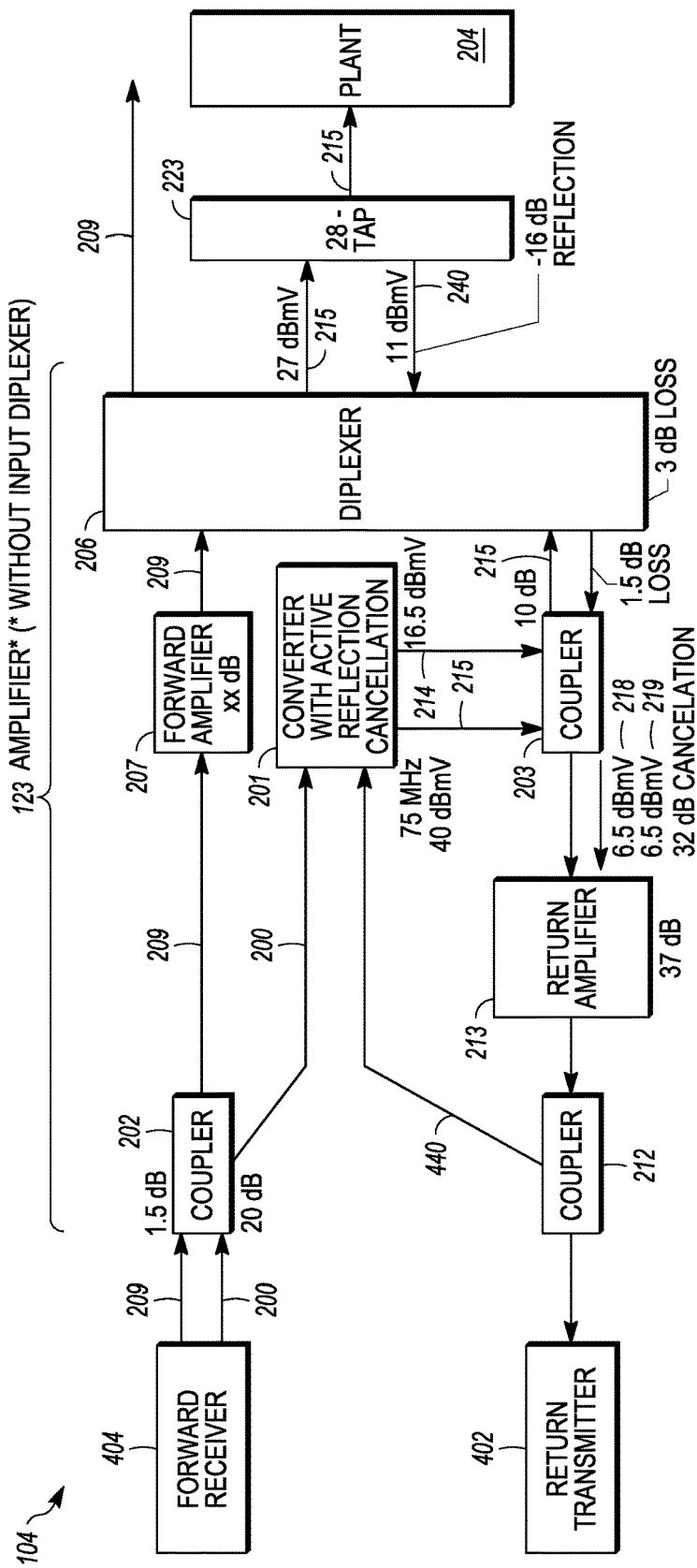
FIG. 4A depicts an example of cancellation techniques employed similar to those shown in FIG. 3A, but in a node according to one embodiment.
Figure 4B:
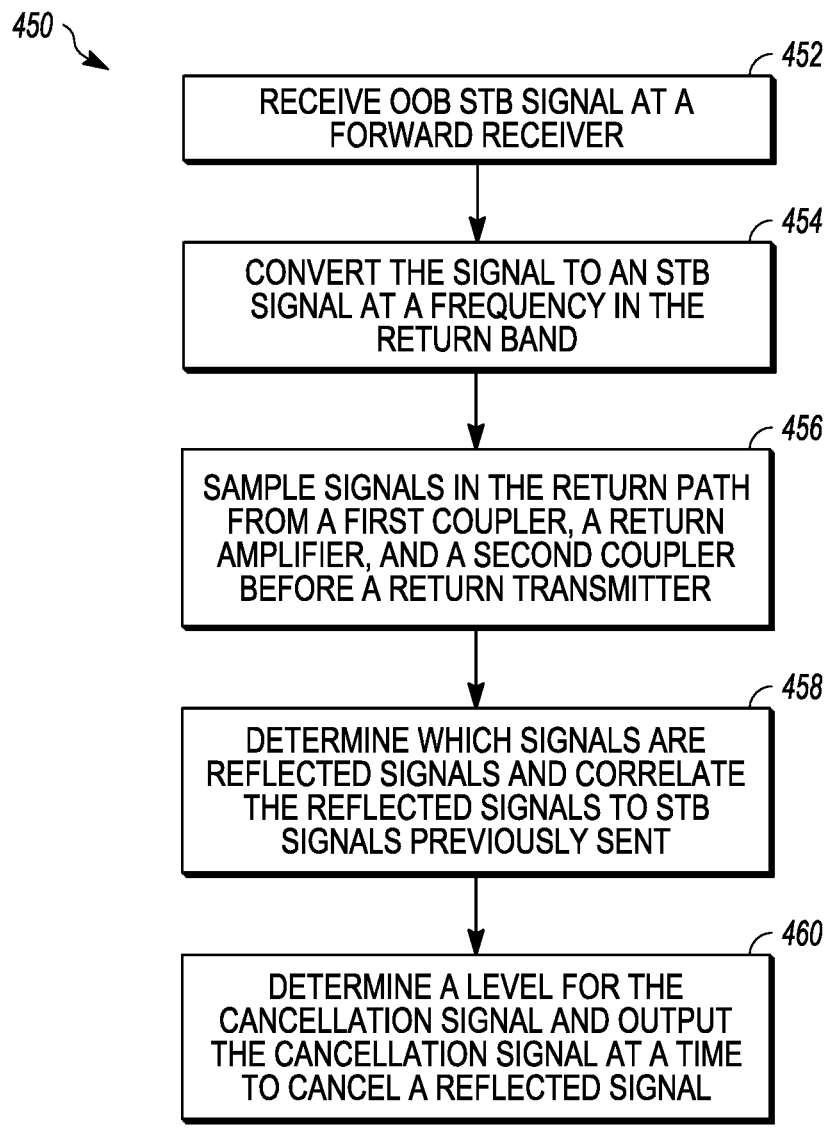
FIG. 4B depicts a simplified flowchart of a method for active cancellation of signals according to one embodiment.
Figure 5A:
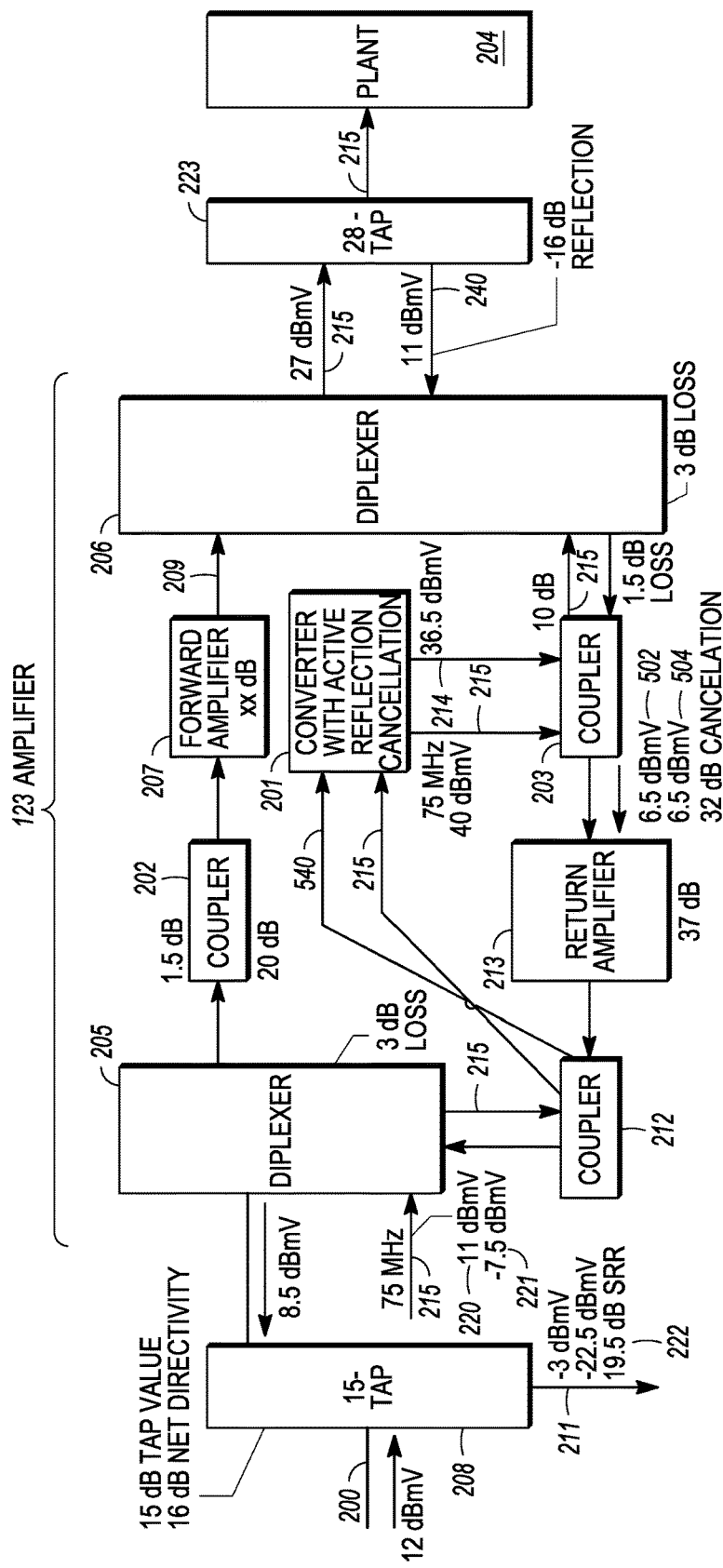
FIG. 5A depicts another example of an amplifier following a node or amplifier with STB signal injection according to one embodiment.

FIGS. 2, 3A, 3B, 4A, 4B, 5A, and 5B illustrate the impact to the CATV system for different embodiments incorporating the disclosed techniques. FIG. 2 illustrates the technical consequences associated with simply adding a converter to an amplifier that does not prevent the upstream amplification of reflected signals from the OOB STB signals. That is, the OOB STB signals are allowed in the return band, but the converter is used such that the OOB STB signals are not amplified. FIGS. 3-5 depict example embodiments for the amplifier that produce better results. FIG. 3A depicts an example of an amplifier with active cancellation. FIG. 4A depicts a node with out of band signal injection. FIG. 5A depicts another embodiment for deploying cancellation techniques in a downstream amplifier from another amplifier.

For purposes of illustrating the disclosed techniques, FIGS. 2-5 are described with example values. For example, the example return amplifier is used with 30 dB gain at 75 MHz. The STB signals are assumed to require 20 dB SNR (e.g., sufficient margin for QPSK). The directivity of couplers due to coupler directivity and network reflections downstream will be assumed to be 16 dB at 75 MHz. The specific level required to the STB depends on data rate, but may range from −15 dBmV to +15 dBmV. The example values are assumed to be sufficient for a common scenario and for sufficiently protecting the STB from other signals generated by in-home equipment transmitting upstream or able to handle such signals at nearby frequencies.

It should be recognized for each of these embodiments that the values used to illustrate examples of the disclosed techniques are merely illustrative. Actual values may be different or may be configured differently Also, STB control signal pickoff may be done interstage or near the amplifier output; or other coupler values may be used, for example, to correspond to the particular design. For example, signal reflections described as being 16 dB lower than that signal, but reflections for some equipment at some frequencies may be worse than −16 dB. Similarly, QPSK may not really require 20 dB SNR, return path gain values may be different from that described, etc.

Example without Echo Cancellation

FIG. 2 depicts an example amplifier 123 with out of band signal injection with forward and reverse path gains. Referring to FIG. 1, the amplifier 123 shown in FIG. 2 is representative of one or more amplifiers 123 in the RF cascade 111. The amplifier cascade length is based on the number of amplifiers 123 in a row or string. Fiber optics minimizes the need for long cascades of amplifiers.

In the downstream path, a signal 209 may be a typical signal sent to set top boxes 106 in the allocated downstream frequency band. Signal 209 is sent through tap 208 to diplexer 205. Diplexer 205 may multiplex signals of different frequencies. For example, both high frequency signals and OOB signals at high frequency (>250 MHz) intended to be put out as lower frequency signals (e.g., 75 MHz) can be multiplexed. For signal 209, diplexer 205 sends signal 209 to a coupler 202, which sends signal 209 to forward (FWD) amplifier 207. Forward amplifier 207 amplifies signal 209 by xx dB, and outputs the amplified signal 209 to a diplexer 206. Diplexer 206 also multiplexes signals of different frequencies and sends signal 209 to plant 204.

A frequency converter 201 is added to the amplifier 123 to allow generation of out of band signals to control "legacy" set top boxes (ones that use <130 MHz control signals) in the downstream direction in frequencies now allocated to the upstream path. The converter 201 receives a STB signal 200 that is carried in the forward direction in the forward frequency band through the diplexer at a frequency higher than the crossover frequency of the diplexer 205, such as around 250 MHz. The forward STB signal 200 is picked up with a 10 or 20 dB directional coupler 202 and provided to the converter 201. Coupler 202 couples a fraction of signal 200 at 245 to converter 201. Converter 201, which may be a frequency converter, puts the STB signal 200 in the forward direction at frequencies around 75 MHz (converted from around 250 MHz for example), and the converted signal is injected into the low frequency (return band) with a 10 dB directional coupler 203 at a frequency below the crossover frequency of the diplexer 205. In one example, the last amplifier 123 in the cascade may convert the STB signal to the 75 MHz frequency that is allocated to the return band. In other embodiments, an amplifier may convert the STB signal to 75 MHz, and this signal is transmitted by other amplifiers 123 to the STB. For purposes of illustration, the converter 201 in this example generates the legacy STB signal at 40 dBmV, and following the diplexer 206, the signal is output from the amplifier station at 27 dBmV (from diplexer 206). The 40 dBmV level signal output from the converter 201 and the 27 dBmV level signal output from the amplifier 123 are the intended set top box signals in the downstream direction via an RF tap 223. In one embodiment RF tap 223 may be a high value tap of around 28 dB that lead to a physical plant 204. The physical plant 204 is coupled to set top boxes 106 via the coaxial distribution cable.

Unwanted reflections in the physical plant 204 (e.g., −16 dB in this example; the "plant" including the nearby 28-tap 223) are reflected back into the amplifier 123, as shown by the 11 dBmV level signal at 240. Due to the return path gain, the reflections are put out sent in the reverse direction from diplexer 205 at almost 41 dBmV as shown at 212; this is an unintended return path signal (212) resulting from the reflections. The return path signal 212 goes to a previous amplifier 123 in the RF cascade 111 via a low value tap, e.g., 15-Tap 208, in the line between the amplifiers. At tap 208, the 40.5 dBmV signal leaks into the tap 208 line due to limited directivity of the tap (and other reflections in the line between the amplifiers that may reflect the 40.5 dBmV signal with a −16 dB reflection to result in a 24.5 dBmV interfering signal into the 15-Tap 208). If the tap 208 then receives an intended STB signal, e.g., the 12 dBmV STB signal 210, from the previous amplifier and coaxial network with taps, the signal 211 comes out of the tap 208 (e.g., −3 dBmV) is weaker than the unwanted reflection (e.g., 9.5 dBmV).

Thus, simply adding the converter 201 can provide the out of band downstream channel signals and convert them to frequencies in the 200 MHz return signal path. However, a negative SNR (−12.5 dB) is obtained for the STB as a result of re-reflection and amplification in the return band and that may not be workable for the STB. Also the return amplifier 213 in this example may become overloaded with the relatively high reflections that are amplified and sent upstream. The reflections themselves may be sufficient for STB signaling such that the STB signal may be generated at only the last amplifier and then get distributed via the reverse gain. However, such a method would rely on reflections and/or poor isolation being present and the time delays of such reflections on the cable not being such that symbols interfere too much or notches are formed in the frequencies provided to the STBs. STBs have some frequency agility and might tune away from notches. Tap directivity at 75 MHz may be changed for such a scheme.

Active Echo Cancellation

The embodiments disclosed in FIGS. 3-5 introduce measures for preventing the upstream amplification of the STB signals that may occur in the amplifier 123 shown in FIG. 2. FIGS. 3-5 also depict various embodiments for providing downstream gain, a repeat function, and/or a converter at each amplifier 123 providing the downstream signal. Also, the amplifier 123 may be inserted at the node 104 or in between the node 104 and the STB 106. With respect to FIGS. 3-5, it will be assumed for purposes of illustration that a high-split architecture is used with the split at 200 MHz or higher such that there is no or not a significant forward gain at the STB signaling frequencies under 200 MHz. STB signaling information will be encoded on a forward frequency that is received by a device in each amplifier 123 and converted to the frequency range required for STBs 106. In the embodiments described, 75 MHz will be assumed. In previous systems, only the node generated the 75 MHz signals and the amplifiers merely forwarded it where the forward frequency band starts at a frequency low enough to include the STB signaling frequency band.

FIG. 3A depicts an example of the amplifier 123 from FIG. 2 but with active cancellation according to one embodiment. For purposes of illustration, the converter 201 in this example converts the STB signal 200 incoming to the amplifier 123 (diplexer 205) into a 40 dBmV signal 215 at 75 MHz, and following the diplexer 206, the signal 215 is output from the amplifier station at 27 dBmV. The 40 dBmV level signal output from the converter 201 and the 27 dBmV level signal output from the amplifier 123 are the intended set top box signals in the downstream direction.

In this embodiment, two features have been added to the converter 201. In addition to generating the intended STB signal 215 from converter 201, the converter 201 samples the output of the return amplifier 213 via a coupler 212 as shown at 246. The converter 201 monitors the signals present at the output of amplifier 213 (in the upstream direction) and generates a signal 214 as an added converter output that is injected into an upstream port of the coupler 203 sitting at the input of the return amplifier 213. The signal amplitude and phase of the signal 214 are set to cancel the unwanted reflection present in the upstream direction, i.e., the signal 214 is used to cancel unwanted signals and reduce their levels substantially.

In this example, the converter output level is set at 16.5 dBmV, which, after coupler loss, results in 6.5 dBmV level shown at 216 at the amplifier input matching the reflected signal 6.5 dBmV level shown at 217 at the return amplifier 213 input, but 180 degrees out of phase. This cancels the reflected signal. For purposes of illustration, a 32 dB cancellation is assumed and an acceptable SRR (signal to reflection ratio) is obtained at tap 208 in front of the amplifier 123. The return chain in RF cascade 111 is also not overloaded with reflected STB signals as the unwanted reverse signal level is greatly suppressed.

While 32 dB cancellation may appear difficult to achieve it should be noted that this is a narrowband cancellation, is self-training, and may be based on cost-effective digital signal processing as the amount of spectrum that is processed is small. In other words, converter 201 may monitor reflected signals and adjust signals 214 to cancel the reflected signals. In one embodiment, these techniques are suitable for applications using 1 Gigabit/s Ethernet (GbE) and 10 GbE protocols for full duplex transmission on copper wires (i.e., one copper pair carries signals in both directions at the same time and the transceivers are able to distinguish their transmitted signals from received signals in the presence of reflections and crosstalk). Thus, even better than 32 dB of reflection cancellation may be achieved with more sophisticated digital signal processing.

It is noted that narrowband cancellation may be based on analog means. For example, a surface acoustic wave (SAW) filter could be used to slice out a narrow band of spectrum (such a filter could also be used in a digital system to minimize the input to the analog-to-digital converter monitoring the return band). With a directional coupler providing input to a SAW filter and an amplifier, the amplifier output could then be provided to a second directional coupler residing upstream in the signal path. With the second directional coupler residing upstream, the delay between the couplers and through the amplifiers can be matched. The amplifier gain and phase would be set such that when the signals are combined the throughput at a frequency range of interest is suppressed. For instance, 20 dB of suppression may be attained routinely using analog means in a narrowband application such as this. Thus, filter requirements (if still necessary) will be greatly reduced.

The analog implementation provides general directivity in a frequency band of interest, also affecting other signals and close-in adjacent frequencies. The analog implementation may also require additional filtering such that it cannot be readily turned off to enable the full upstream bandwidth. If such filtering is not required then it could be turned off remotely by just turning off the amplifier in the cancellation circuit. Once turned off it would no longer affect upstream traffic.

Due to the cost curve of digital signal processing means it is expected that a digital reflection cancellation will be cost effective (note that this disclosure permits significant latency). Furthermore, embodiments of the digital implementation may provide advantages. For example, embodiments of the digital implementation may have frequency agility. In another example, embodiments of the digital implementation may only ensure that converter output does not travel in an unwanted upstream direction, thereby not affecting other upstream signals (even if they are within the same frequency band). Thus, embodiments of the digital implementation do not block any upstream traffic, even when active.

FIG. 3B depicts a simplified flowchart 350 of a method for active cancellation of signals according to one embodiment. At 352, an amplifier 123 receives OOB STB signal 200 at a frequency above the crossover frequency of diplexer 205. This signal is intended to be sent in the return band. Thus, at 354, converter 201 converts the signal to STB signal 215 at a frequency in the return band, such as from 250 MHz to 75 MHz. To convert the signal, converter 201 may decode STB signal 200. Then, converter 201 converts the signal, and re-encodes it to STB signal 215. By decoding the signal, converter 215 can determine information for STB signal 215 that can allow it to identify any echo caused by sending STB signal 215.

At 356, converter 201 samples signals in the return path from coupler 203, return amplifier 213, and coupler 212. At 358, converter 201 determines which signals are reflected signals and correlates the reflected signals to STB signals 215 previously sent. By determining which signals are reflected signals and correlating them to previously sent signals, converter 201 may adjust signals 214 to cancel reflections of STB signals 215. This provides a control loop as converter 201 continuously analyzes reflected signals, correlates them to signals sent 215, and adjusts signals 214 to be sent such that they cancel reflections of signal sent 215. At 360, converter 201 then determines a level for signal 214 and outputs signal 214 at a time to cancel a reflected signal.

Amplifiers 123 may be included in different places in the network. For example, amplifiers 123 may be included in various nodes, such as field nodes (e.g., HFC nodes), remote nodes (e.g., remote PHY Nodes or remote converged cable access platform (R-CCAP) nodes), or may be downstream amplifiers. FIGS. 4-6 depict the different embodiments.

Active Cancellation in a Node 104

FIG. 4A depicts an example of cancellation techniques employed similar to those shown in FIG. 3A, but in a node 104 according to one embodiment. The cancellation techniques prevent too much STB signal reflection from getting into a return transmitter 402 of node 104 such that it cannot get overloaded.

As shown in FIG. 4A, inside node 104, an amplifier 123 has been implemented but without the input diplexer 205. A forward receiver 404 of node 104 may receive a signal 209 that may be a typical signal sent to set top boxes 106 in the allocated downstream frequency band. Signal 209 is sent through coupler 202, which sends signal 209 to forward amplifier 207. Forward amplifier 207 amplifies signal 208 by xx dB, and outputs the amplified signal 209 to diplexer 206. Diplexer 206 also multiplexes signals of different frequencies and sends signal 209 to plant 204.

Node 104 also receives OOB STB signals 200 that should be sent in the upstream frequency band to STBs as described above. STB signal 200 is sent through coupler 202 to converter 201, and output as a 75 MHz STB signal 215. Converter 201 outputs the STB control signal 215 at a level of 40 dBmV to a 10 dB coupler that provides the signal to the node output via the diplexer filter 206 with an example loss of 3 dB resulting in a 27 dBmV node output level.

As shown in FIG. 4A, in addition to generating the intended STB signal 215, the converter 201 samples the output of the return amplifier 213 via a coupler 212 at 440. The converter 201 monitors the signals present at the amplifier 213 output (in upstream direction) and generates a signal 214 as an added converter output that is injected into an upstream port of the coupler 203 sitting at the input of the return amplifier 213.

The STB data signal 215 in FIG. 4A may be provided to the node 104 in the forward band without up or down-conversion. Each amplifier in line with the node 104 picks up the STB signal 215 coming from the node 104 or previous amplifier 123 (with an example 10 dB loss between amplifiers), reflecting (or cancelling, as described below) unwanted reflections (shown as 11 dBmV at 240 with a −16 dB reflection and a 27 dBmV output level from node 104) back in to the amplifier 123. In one embodiment, in a node return amplifier 213 may not be present. In this case, the upstream signal may just be coupled through a coupler, such as coupler 212 and/or coupler 203.

The reflected signal is provided to the coupler 203. The reflected level is passed through the diplex filter 206 and coupler 203 with 3 dB and 1.5 dB loss, respectively, resulting in a 6.5 dBmV reflected signal level at 216 into the return amplifier, 213 and from there to return transmitter 402 via coupler 212. Coupler 212 provides a fraction of the reflected signal to the converter 201 that adjusts signal 214 to cancel the reflected signal. In this example, the converter output level of signal 214 is set at 16.5 dBmV which, after coupler 203 loss of 10 dB, results in a 6.5 dBmV signal 219 at the output of coupler 203 for cancellation of the 6.5 dBmV signal 218 caused by reflections in the plant 204. The forward amplifier 207 is otherwise filtered (at least by an output diplex filter 206) such that it only operates above the highsplit (for instance 200 MHz) frequency and it does not directly provide an STB control signal 215 to the plant. In one embodiment, only signals in the allocated downstream frequency are amplified by forward amplifier 207, and OOB STB signals 200 are sent to converter 201 and coupler 202 may include a filter function for that purpose.

FIG. 4B depicts a simplified flowchart 450 of a method for active cancellation of signals according to one embodiment. At 452, node 104 receives OOB STB signal 200 at forward receiver 404. This signal is intended to be sent in the return band. Thus, at 454, converter 201 converts the signal to STB signal 215 at a frequency in the return band, such as 75 MHz. As discussed above, to convert the signal, converter 201 may decode STB signal 200. Then, converter 201 converts the signal, and re-encodes it to STB signal 215.

At 456, converter 201 samples signals in the return path from coupler 203, return amplifier 213, and coupler 212 before a return transmitter 402. At 458, converter 201 determines which signals are reflected signals and correlates the reflected signals to STB signals 215 previously sent. At 460, converter 201 then determines a level for signal 214 and outputs signal 214 at a time to cancel a reflected signal.

Active Cancelation in an Amplifier 123 that is Receiving a STB Signal from Another Amplifier or Node FIG. 5A depicts another example of an amplifier following a node 104 or amplifier 123 with STB signal injection 215 according to one embodiment. In embodiments, each amplifier 123 in line with the node picks up the STB signal 215 coming from the node 104 or previous amplifier 123. This is the case when the conversion is not performed by the last amplifier 123 in the cascade. In this case, the OOB STB signal that is received is at 75 MHz. In this example, with a 16 dB loss between amplifiers 123, the result would be an 11 dBmV input shown at 220 to the amplifier 123. At the same time an unwanted re-reflection (−16 dB reflection between amplifiers) of the reverse amplified STB signal 200 is still present (−7.5 dBmV shown at 221 in the example shown).

In this case, STB signal 215 has already been converted to 75 MHz and does not need to be frequency converted again. Thus, STB signal 215 does not go through the high split of diplexer 205 to coupler 202. Rather, diplexer 205 may pass the low frequency signal to coupler 212, which is the coupler in the upstream direction, but the STB signal 215 is passed through coupler 212 in the downstream direction. This is because coupler 212 is configured to pass signals in the frequencies allocated to the return band. The incoming STB signal 215 is picked up by converter 201 from coupler 212. Converter 201 performs the function of regenerating the 75 MHz signal 215 (e.g., reconstituting the signal's +40 dBmV level, not frequency converting the signal). Converter 201 outputs STB signal 215 to coupler 203 and then diplexer 206. This sends STB signal 215 to the next amplifier 123, or STB via 28-Tap 223.

Once again, the converter 201 can cancel any reflections of STB signal 215. For example, converter 201 generates a signal 214 as an added converter output that is injected into an upstream port of the coupler 203 sitting at the input of the return amplifier 213. This signal cancels the 6.5 dBmV reflected signal at 502 from sending STB signal 215 with a 6.5 dBmV signal at 504. In one embodiment, converter 201 samples the output of the return amplifier 213 via a coupler 212 at 540. The converter 201 monitors the signals present at the amplifier 213 output (in upstream direction) and can use this in generating signal 214.

If the tap 208 then receives an intended STB signal, e.g., the 12 dBmV STB signal 210, from the previous amplifier and coaxial network with taps, the signal 211 comes out of the tap 208 (e.g., −3 dBmV) is weaker than the unwanted reflection (e.g., 9.5 dBmV). The signal to reflection ratio shown at 222 as seen by the amplifier 123 in this example approaches 20 dB, sufficient for QPSK. The example reflection cancellation values may be sufficient for the converter input to be able to detect the STB OOB signal error-free. Thus, an improvement of the signal processing, wherein the converter 201 separates incoming data from its own reflections such that the data is internal to the signal processing of the converter 201, can be achieved.

In some embodiments, frequency conversion is not required; but 75 MHz STB data signal regeneration is needed. The return amplifier does not block upstream traffic; but it does block downstream signals by its reverse isolation. In embodiments, upstream traffic is selected so as not to cause problems for STBs listening to the same spectrum. For example, the regenerator may be inactive as long as there is no valid STB signal presented to them such that they do not affect the upstream signal flow.

Figure 5B:
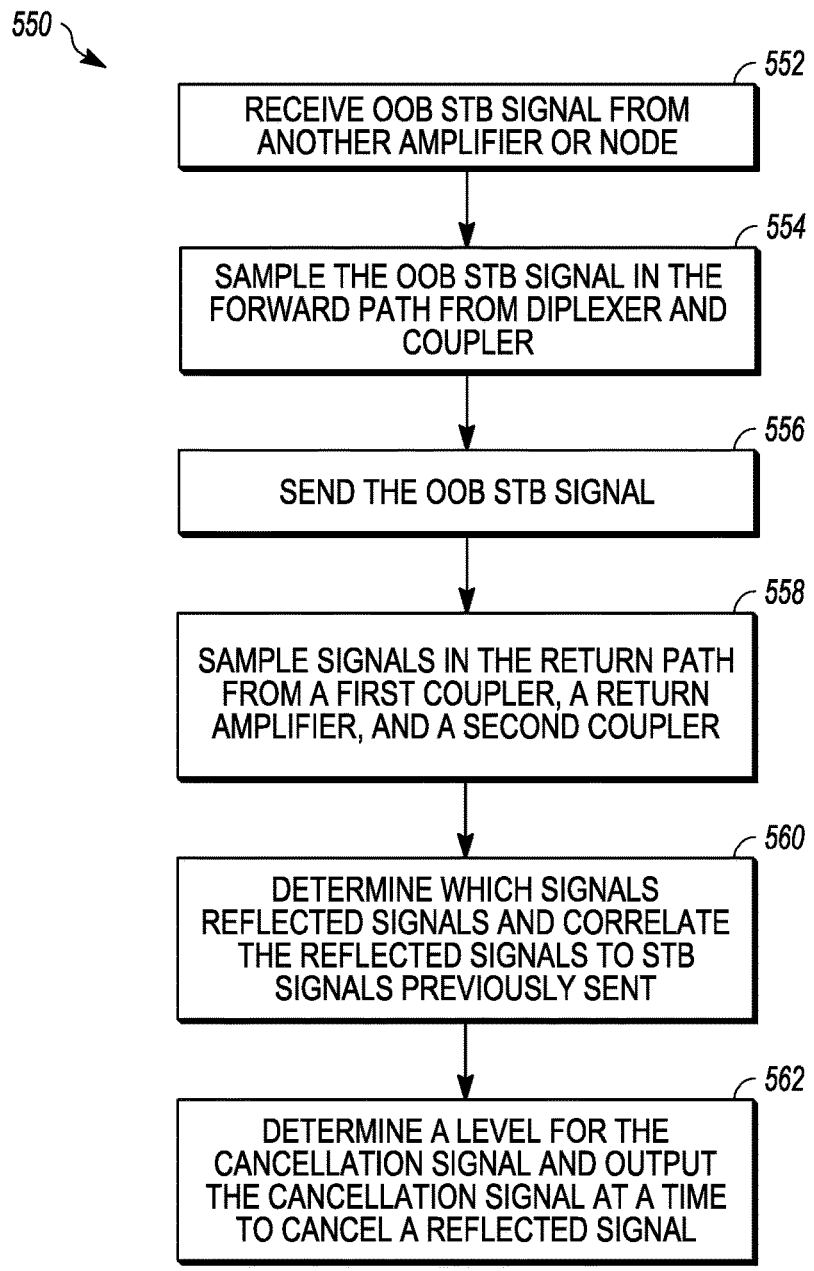
FIG. 5B depicts a simplified flowchart of a method for active cancellation of signals according to one embodiment.
Figure 6:
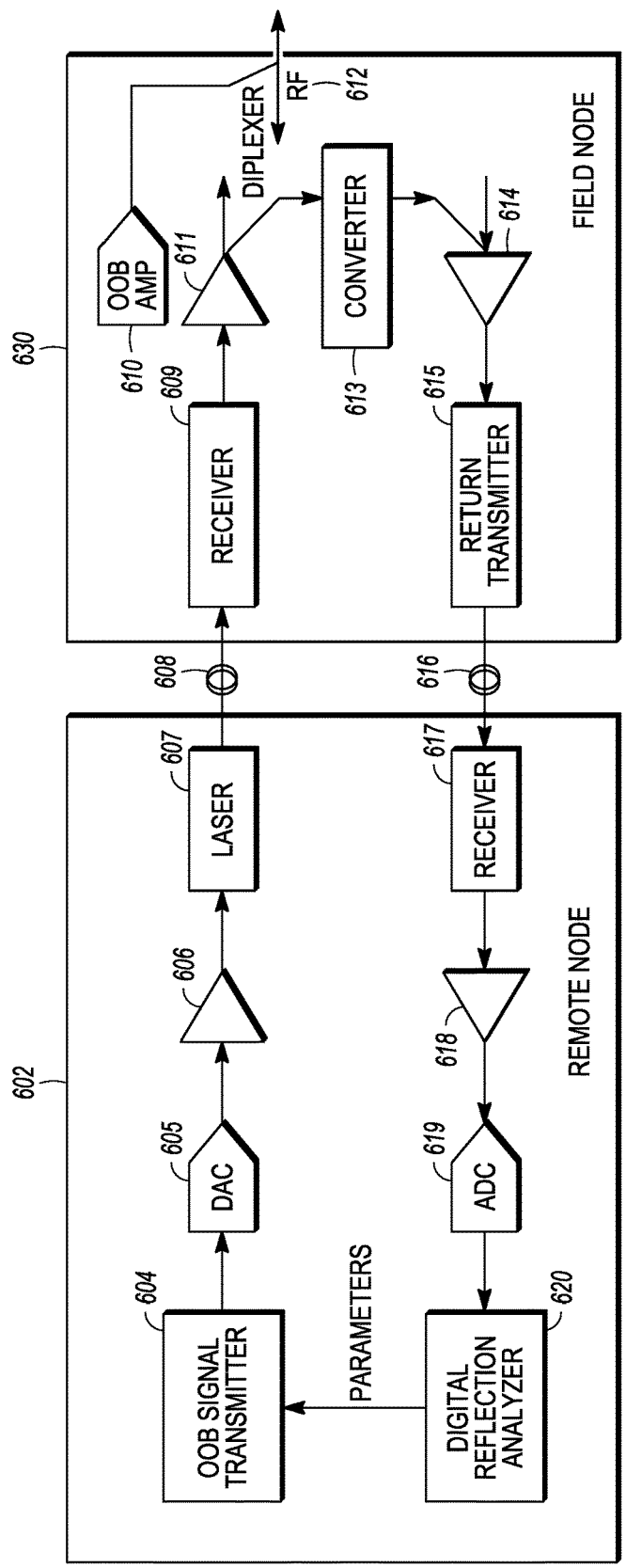
FIG. 6 depicts an example system for injecting out of band signals, e.g., STB control signals, in a field node via a narrowband out of band signal amplifier according to one embodiment.

FIG. 5B depicts a simplified flowchart 550 of a method for active cancellation of signals according to one embodiment. At 552, an amplifier 123 receives OOB STB signal 215 from another amplifier 123 or node 104. This signal is intended to be sent in the return band, and has already been converted to STB signal 215 at a frequency in the return band, such as 75 MHz. At 554, converter 201 samples signals in the forward path from diplexer 205 and coupler 212. This is the 75 MHz OOB STB signal. At 556, converter 201 sends STB signal 215 at the 75 MHz frequency. At 558, converter 201 samples signals in the return path from coupler 203, return amplifier 213, and coupler 212. At 560, converter 201 determines which signals are reflected signals and correlates the reflected signals to STB signals 215 previously sent. At 562, converter 201 then determines a level for signal 214 and outputs signal 214 at a time to cancel a reflected signal. Converter 201 is thus performing the same adjustment and cancellation for signals that are already converted to 75 MHz.

In FIGS. 3-5, the out of band signals may travel in a forward direction in the modified return bands as described. Disclosed is a repeater for receiving an out of band (OOB) communication signal, processing it, and re-transmitting it in to a coaxial link. That is, amplifier 123 does not amplify an OOB STB signal, but rather converts the signal and sends the signal through the return band. For example, the coaxial link has taps to homes with devices that receive the out of band (OOB) communication signal. The coaxial link also links to amplifier locations with a repeater in the amplifier that forwards legacy out of band communication signals. Thus, an out of band signal to a set top box may travel in a forward direction in the modified return band with active regenerators.

At each amplifier location with a repeater, in embodiments, the repeater monitors the reflection present in the transmitted out of band signal at the input and or at the output of the return amplifier in that amplifier location. The repeater injects a copy of the out of band signal in to the return amplifier that is adjusted to cancel the reflected signal. The amplitude and delay of this copy is adjusted to obtain cancellation. The correct amplitude and delay are determined in a long-term averaging process of monitoring the unwanted reflected signals such that there is no requirement for fast responding control loops that would otherwise be challenging to implement. The active regenerators are equipped with active echo cancellation procedures to prevent return amplification of the out of band signals by the analog return amplifiers. Thus, the regenerators may prevent overload conditions where the network is over-driven by multiple echoes of the out of band signals.

In some embodiments, active regenerators only respond to signals with out of band signal modulation. Thus, active repeater functionality may be transparent to the return bandwidth at out of band frequencies when no forward out of band signaling is provided. In embodiments, the active regenerators only respond to signals with out of band control signal modulation. Thus, if a signal has out of band control signal modulation, the active echo cancellation may work without active or passive filters and work transparent to normal implementations, multitasking and parallel processing may be advantageous.

FIG. 6 depicts an example system for injecting out of band signals, e.g., STB signals in a field node 630 via a narrowband out of band signal amplifier according to one embodiment. In a node+0 architecture STB OOB signals (e.g., 75 MHz) can be injected in forward direction by an OOB amplifier (AMP) 610 into an otherwise full high-split return spectrum (e.g., 5-200 MHz), thereby injecting the STB OOB signals at an injection point beyond the diplex filter of the node 104. While this can be directional such that the STB OOB signal is put out in the forward direction a reflection of that signal can still end up in the return amplifier 614 and optic components 616, 617, 618, and 619. For a poor reflection condition, the injection can result in a significant reflected power and detrimentally affect the performance of the return transmitter 615.

A digital reflection analyzer device 620 can detect the presence of reflections of the STB OOB signals. In embodiments, digital reflection analyzer device 620 is found in a remote node (such as a remote converged cable access platform (R-CCAP) 602. An R-CCAP device/architecture may be combined with AM optic components, DAC 605, amplifier 606, laser 607, receiver 609, laser 615, and receiver 617, in a star architecture to support STB out of band signals. Digital reflection analyzer device 620 can detect the presence of the STB OOB signals and control mechanisms to suppress the reflections. For example, described above with respect to FIGS. 3-5 are control mechanisms to suppress the reflections using echo cancellation with STB OOB signals. In embodiments, the control mechanisms control the amplitude and phase of an STB OOB signal deliberately injected into the return transmitter 615 to cancel out the reflection. In embodiments, an OOB signal transmitter 604 creates a forward signal at an alternate frequency that is frequency converted to the STB OOB frequency and injected into the reverse direction to cancel out reflections.

In an example embodiment, the signal is injected at an RF test point of the field node that provides a path to inject a signal, albeit at a high loss. Because the STB OOB signal is narrowband and relatively low power, this loss may be acceptable. Further, the main path loss is not affected if the existing tap for the test point is used. The R-CCAP node 602 can include digital reflection analyzer device 620 to detect reflections of the STB OOB signal. If the reflections are severe, then a reflection cancellation signal can be generated by OOB signal transmitter 604 based on parameters from digital reflection analyzer device 620, and sent to the field node 630 modulated on another frequency. Field node 630 receives this signal, converts the signal back to the OOB signal frequency range via a converter 613, and feeds the reflection cancellation signal into the reverse path at amplifier 614 and/or laser 615 to cancel it.

Note that the OOB signal itself may also be modulated onto another frequency such that the OOB amplifier 610 performs the conversion to the STB OOB target frequency. In that case the cancellation signal could be generated without further need for conversion at field node 630. Where the STB OOB signal is not needed the narrowband OOB signal amplifier and/or echo cancellation converter need not be installed, so this can be an optional plug-in module.

Figure 7:
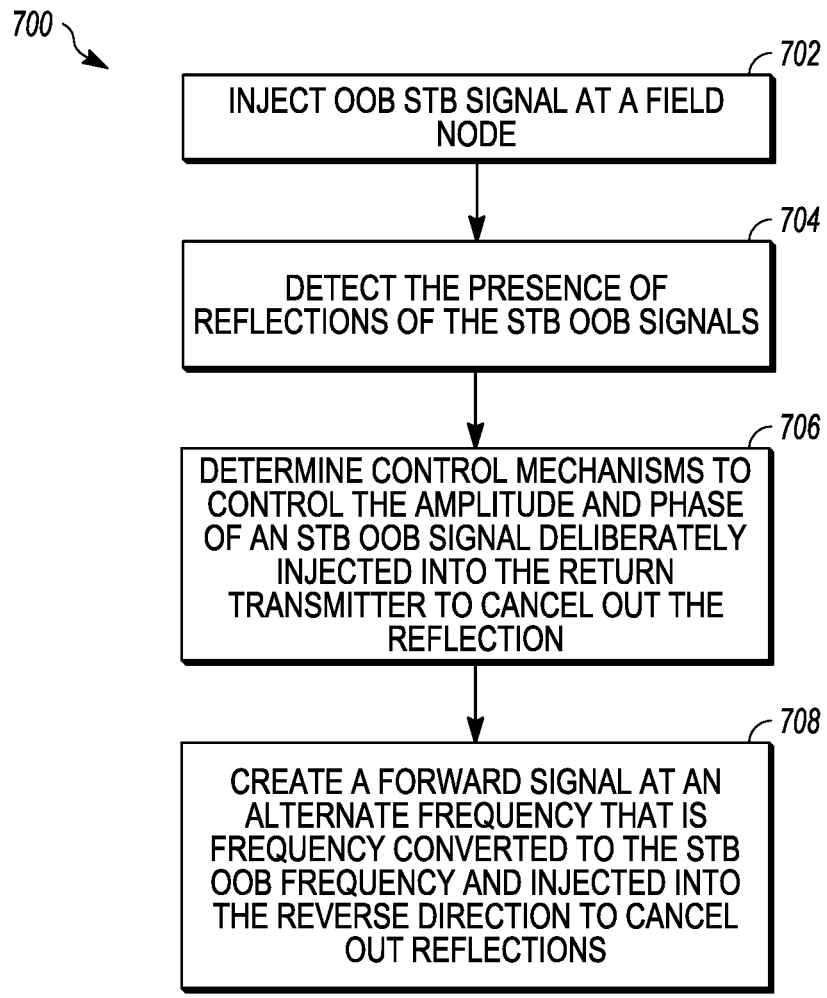
FIG. 7 depicts a simplified flowchart of a method for active cancellation of signals according to one embodiment.

FIG. 7 depicts a simplified flowchart 700 of a method for active cancellation of signals according to one embodiment. At 702, an STB signal 200 is injected at a field node 630, such as by an OOB amplifier 610. This signal is intended to be sent in the return band. At 704, digital reflection analyzer device 620 detects the presence of reflections of the STB OOB signals. At 706, digital reflection analyzer device 620 determines control mechanisms to control the amplitude and phase of an STB OOB signal deliberately injected into the return transmitter 615 to cancel out the reflection. At 708, OOB signal transmitter 604 creates a forward signal at an alternate frequency that is frequency converted to the STB OOB frequency and injected into the reverse direction to cancel out reflections.

II. Removal of Diplexer in Bidirectional Communication

Disclosed are embodiments for a full or partial elimination of the diplexer. Embodiments disclosed include techniques for avoiding the loss of usable frequency spectrum. Disclosed are embodiments with a top-split architecture without use of a diplexer filter for coaxial and wireless services. The top-split architecture may eliminate the need for analog di(tri-)plex filters. As disclosed and described below, by avoiding the need for diplexer filters through the use of reflection cancellation methods, loss of usable frequency spectrum may be avoided or reduced significantly.

Problems when not Using a Diplexer

Figure 8:
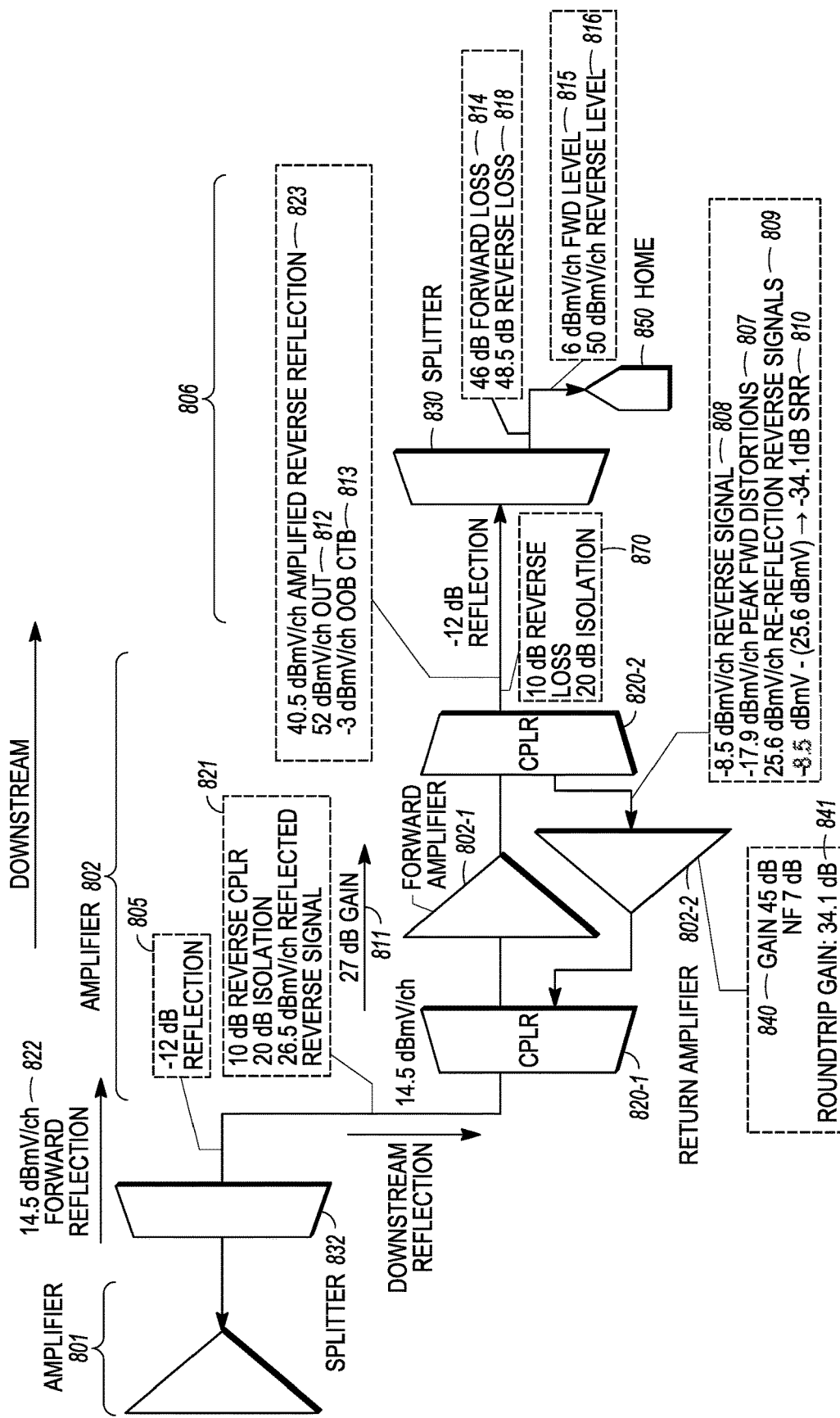
FIG. 8 depicts an example bidirectional communication system that exemplifies the reflected signal problems introduced by the use of a diplexer.

FIG. 8 depicts an example bidirectional communication system that exemplifies the reflected signal problems introduced by the use of a diplexer. In a bidirectional communication system the diplexer is conventionally needed for a number of reasons. Amplifiers have residual gain beyond their frequency band of use and oscillation must be prevented. Even with perfect directional couplers (or circulators) at an amplifier, reflections external to the amplifier cause traffic in one direction to be reflected into the opposite direction where residual out-of band amplifier gain will amplify the unwanted signal. For instance, upstream traffic is reflected forward again into the input of an amplifier, which amplifies it to a high level and adds it to the downstream signal.

At a second reflection downstream from the amplifier, the re-reflected signal is then travelling upstream again and mixing with other upstream signals. The level difference between upstream and downstream signals at each amplifier port is large because the intermediate link loss can be high, thus re-reflected signal amplitudes can be considerable and of the same magnitude as wanted signals which can thus be masked by the unwanted signals.

Furthermore analog amplifiers have limited distortion performance. While distortions are low relative to an amplifier output level they are still strong relative to an upstream input level presented to an amplifier. Because the distortion spectrum extends beyond the signal bandwidth the distortions will thus in part overlap with the input signal spectrum to in the upstream direction and SNR will be degraded. This is illustrated in FIG. 8.

FIG. 8 depicts an example system with two amplifiers; left to right is forward direction. The relevant numbers for the illustration in FIG. 8 using example values are listed in the table depicted in FIG. 9. A first amplifier 801 is represented by a single block for forward gain and a second amplifier 802 is shown in more detail. Second amplifier 802 includes a forward amplifier 802-1 that amplifies a signal in the forward direction and a return amplifier 802-2 that amplifies a signal in the return direction. A network to the home 806 is a connection to a home 850 and includes a splitter 830 to split a signal to various homes 850. The amplifier 802 also has a directional coupler (CPLR) 820-1 at the input and a directional coupler 820-2 at the output. At the output of amplifier 802 at 870, the directional coupler 820-2 has a 10 dB loss in reverse direction, but also provides 20 dB of loss between forward and reverse signals due to its directivity. A similar coupler 820-1 is also used at the amplifier input such that in theory forward and reverse signals would be separated even without a diplexer filter.

In operation, even if these couplers 820 function perfectly there are reflections in the physical plant, such as 12 dB down reflection shown at 805 at a splitter 832 downstream from the amplifier 801. Also, a reflection can occur upstream from the amplifier 801 at a tap between the first and second amplifiers 801 and 802 (not shown). The addition of the amplifier gain, isolation coupler losses, and reflection effects results in 27 dB roundtrip (RT) gain shown at 811. Without further measures, this reflection would oscillate going back and forth in the system. Practical losses, forward and reverse signal levels are shown. As shown in FIG. 8, a usable signal level results at the return amplifier 802-2 providing an SNR of around 41 dB relative to the thermal noise.

However, when looking at out of band forward amplifier distortions (−55 dBc composite triple beat (CTB)) that leaks and gets reflected into the return amplifier 802-2 at a level of around −18 dBmV/ch shown at 807, it is apparent that the reflection would limit the available return SDR (signal to distortion ratio) to around 9 dB as shown at 808. Even worse is the signal to re-reflected reverse signal ratio (SRR) shown at 810 that is negative (~−34 dB) due to the high re-reflected signal level shown 809 of around 25 dBmV/ch.

Referring to FIGS. 8 and 9, the amplifier gain shown at 811 in forward direction is 27 dB and the amplifier gain slope or signal tilt is 15 dB between 55 and 750 MHz. The amplifier output level shown at 812 is 52 dBmV/channel at 750 MHz and the signal to distortion ratio is 55 dB such that the distortion level shown at 813 is −3 dBmV/channel. The forward loss shown at 814 to the home 850 is 46 dB resulting in a level shown at 815 of 6 dBmV/ch at the home 850. Considering a thermal noise floor of a 75 Ohm receiver to be −59.2 dBmV in a 4.2 MHz channel bandwidth, in this bandwidth a best-case signal to noise ratio of 65.2 dB can be obtained. In practice, further splitter loss and noise from the preceding amplifier chain and fiber optic transmission link limit the practical signal to noise to less than 50 dB.

In the reverse direction a home transmission level shown at 816 of 50 dBmV is used per 6 MHz channel and 150 MHz of bandwidth is used. Using these example values, a total home transmission power of 64 dBmV results. For purposes of a non-limiting illustration, the NTSC77 flat equivalent power is listed, which is the per channel power of a 77 channel NTSC plan that would result in the same total power. Assuming a 256-QAM modulation format with 40 Mbps/6 MHz data efficiency such that the 150 MHz bandwidth results in a total throughput of 1 Gbps. The loss shown at 818 from modem to home 850 in the reverse direction is 48.5 dB such that 1.5 dBmV/ch remains at the input of the amplifier housing. Via the 10 dB coupler 820-2, the signal that gets to the reverse amplifier 802-2 will then have −8.5 dBmV/ch input level shown at 808. With a practical reverse amplifier noise figure of 7 dB and a thermal noise floor of −57.2 dBmV/6 MHz, a signal to noise ratio of 41.7 dB results. That is sufficient for 256-QAM.

The distortion level at the output from the forward amplifier 802-1 (at −3 dBmV) is in the forward direction and would not interfere with the return traffic. However, due to limited coupler 820-2 isolation (20 dB) and a downstream reflection shown at 805 (−12 dB), respectively, components of the distortion signals arrive at the input of return amplifier 802-2. The reflected distortion levels are −23 dBmV and −25 dBmV, respectively, at the return amplifier 802-2 input. In the worst case, these amplitudes add up (20 log addition rule as opposed to 10 log addition rule for power addition) and a total input level shown at 807 at the return amplifier 802-2 of −17.9 dBmV/ch results at the return amplifier 802-2 input. With the signal level shown at 808 of −8.5 dBmV/ch that results in a signal to reflected distortion ratio (SDR) of a mere 9.4 dB, the result is insufficient for 256 QAM operation.

The return amplifier 802-2 has a gain of 45 dB shown at 840. Through the coupler 820-1 at the output of return amplifier 802-2, a level shown at 821 of 26.5 dBmV/ch is provided to the preceding amplifier station 801. With a reflection shown at 805 of −12 dB in the preceding network, a level shown at 822 of 14.5 dBmV/ch is reflected back in forward direction. The forward amplifier 802-1 amplifies this reflection shown at 811 (27 dB gain) resulting in a 40.5 dBmV/ch output level shown at 823 of the forward amplifier 802-1 for this reflected component. Note that this level is 43.5 dB higher than that of the distortion output level of the forward amplifier 802-1 (that was −3 dBmV, from 211 in FIG. 3A). Like the calculation of the SDR at the return amplifier 802-2 input, a calculation of the signal to reflection ratio (SRR) at the input of the return amplifier 802-2 results in a SRR of −34.1 dB. In other words the level of the signal reflections is much greater than the wanted signals. Finally, a loop gain of 34.1 dB is calculated and shown at 841, which is the difference between reflected signal into the return amplifier 802-2 and intended signal into the return amplifier 802-2.

As shown by this example in FIG. 8, the system depicted without diplexer filters may not work. To prevent oscillation, a crossover filter with at least 40 dB of suppression needs to be used to separate the forward and reverse signal band. Thus, a diplexer is used to resolve these issues. Firstly, the diplexer is used to prevent oscillation. Secondly, out of band amplifier gain is removed to eliminate re-reflected signals. Thirdly, out of band amplifier distortions are removed. However, practical implementation limits of analog filters result in a significant loss of bandwidth. If a diplexer could be avoided, even at cost of greater complexity, more system capacity can be made available.

Use of Upstream Regenerators

Disclosed herein are embodiments using upstream regenerator systems instead of upstream (return or reverse) amplifiers to address the oscillation problems discussed above. Regenerator systems may demodulate and remodulate data, and operate in the digital domain and allow faster processing of signals, which may be necessary in the high frequency domain. In embodiments, active echo cancellation techniques are implemented in the regenerator modules and with spectrum shifts are disclosed to address out of band amplifier gain that results in reflection amplification. In embodiments, a combination of amplifier output filtering, active distortion cancellation and digital distortion cancellation by the regenerators address amplifier distortion. The disclosed techniques are described in the context of narrowband OFDM (Orthogonal Frequency Division Multiplexing), but it should be understood that the disclosed techniques can apply with alternate robust modulation schemes.

Figure 10:
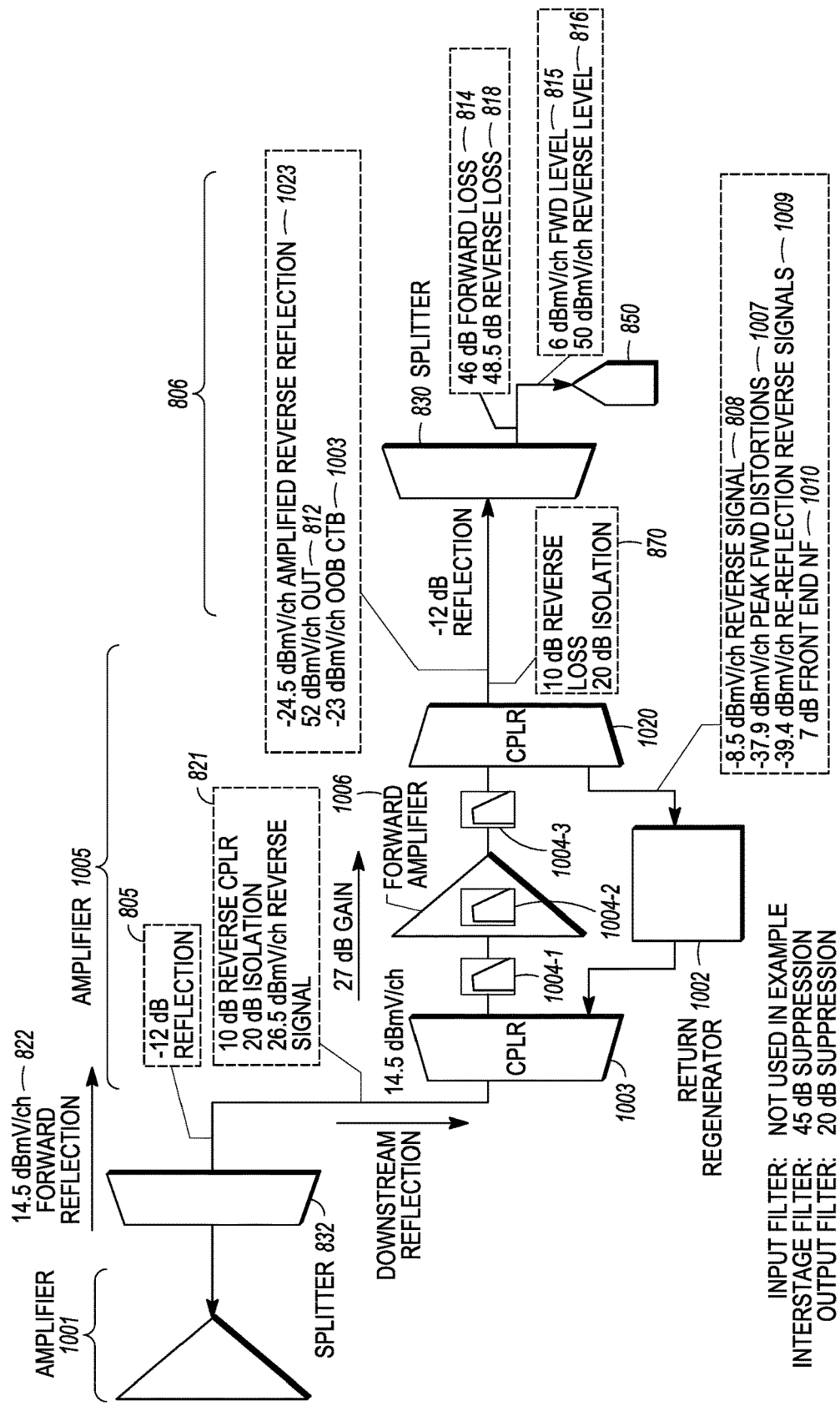
FIG. 10 depicts a return regenerator with relaxed filter requirements.

FIG. 10 depicts a return regenerator 1002 with relaxed filter requirements. Amplifier 1001 and amplifier 1005 are provided. If return regenerator 1002 is used instead of a return amplifier, the problem of oscillation may be resolved according to particular embodiments. However the problems of re-reflection and output stage distortions may still present an issue. Both of these problems are a function of the rolloff of the forward amplifier gain above its highest operating frequency. This role can be enhanced by placing low-pass filters 1004-1, 1004-2, and 1004-3 at amplifier input, inter-stage, and/or at the output of forward amplifier 1006. Any combination of these filters may be used. For example, only inter-stage filter 1004-2 may be used, or multiple filters may be used, such as input filter 1004-1 and output filter 1004-3.

The interstage filter 1004-2 with an example suppression of 45 dB and output filter 1004-3 with an example suppression of 20 dB suppress amplifier output amplified reverse reflection by 65 dB from 40.5 dBmV/ch shown at 813 in FIG. 8 to −24.5 dBmV/ch shown at 1013. The output filter 1004-3 suppresses amplifier output distortions from −3 dBmV/ch shown at 813 to −23 dBmV per channel shown at 1013; note that a mere 20 dB suppression of distortion shown at 807 results in a reduction of distortions to −37.9 dBmV/ch shown at 1007 yielding an improvement of the 9.4 dB SDR to almost 30 dB SDR, which is already sufficient for 64-QAM. Such a modest suppression can be attained with a smaller loss of usable frequency range than would be required for a 40 dB suppression of a diplex filter.

The inter-stage filter 1004-2 is used for suppression of re-reflected signals, this filter 1004-2 is deliberately placed at the inter stage within amplifier 1006 where it does not degrade amplifier noise figure (NF) of 7 dB at 1010 and a higher filter loss can be tolerated such that a sharp cutoff can be realized. When the inter stage filter 1004-2 reaches 45 dB of suppression then together with the output filter 1004-3, the reflection level output from the amplifier 802 in FIG. 8 of 40.5 dBmV/ch shown at 823 in FIG. 8 is reduced to −24.5 dBmV/ch shown at 1023. Then, the re-reflected level of 25.6 dBmV/ch shown at 809 is then reduced to −39.4 dBmV/ch shown at 1009 and the SRR also reaches 30 dB, While the suppression and SRR combined value would still limit the transmission to, for instance, 16-QAM this generally does not apply in practice. The re-reflections have an unpredictable pattern and distortion reflections also have a pattern; the calculation here was performed under the assumption of worst case addition of reflection and isolation from the coupler 1020. That means that at certain frequencies this worst-case addition may occur but at most frequencies the impairments will be less. An OFDM modulation scheme for instance can utilize individual sub-bands to the available capacity such that even with these impairments a higher than expected data throughput can be achieved.

Filter 1004-1 filters the input of amplifier 1006. This may be an alternate filter location. This filter can be used if inter-stage access is not available, but filter 1004-1 can also be used in conjunction with inter-stage filter 1004-2.

Filters 1004 remove the high frequency noise in the reflections. This allows regenerator 1002 to operate in the return band at a high frequency above the frequency of the downstream path.

Relevant numbers that correspond to values described in FIG. 8 have been left in for illustrative purposes. It will be appreciated that other values may be used.

Furthermore, a return regenerator 1002 need not use the part of the spectrum that is not sufficiently suppressed by the filters 1004, by skipping only a small amount of bandwidth at the regenerator output, the re-reflections can be reduced to an insignificant level such that only the amplifier output distortions limit the available bandwidth. Note that this means that communication to the homes 850 may take place at the lowest possible frequency band limited only by the amplifier output distortions; elimination thereof will be discussed later resulting in a further reduction of the output filter requirement. Upstream communication between the amplifiers may take place at slightly higher frequencies chosen to alleviate the inter-stage filter requirement (other means to further alleviate these requirements are described herein).

To retain the same bandwidth there are two possible choices, both enabled by the lower loss and limited number of taps between amplifiers as compared to what may be found between an amplifier and a home. The limited number of taps between each amplifier pair implies that the spectrum impairments will generally be less severe between an amplifier pair than between an amplifier and a home. As a result an OFDM scheme can use a wider spectrum and the same bandwidth can be expected to be available. This spectrum may overlap with multimedia over coax alliance (MOCA) frequencies as it is not used to communicate with homes (other than signal leakage due to tap isolation limits). Secondly a reduced loss between amplifiers can permit a higher bps/Hz coding efficiency between amplifiers such that the loss of bandwidth does not need to be recovered.

Return Regenerator with Active Reflection Cancellation

Figure 11:
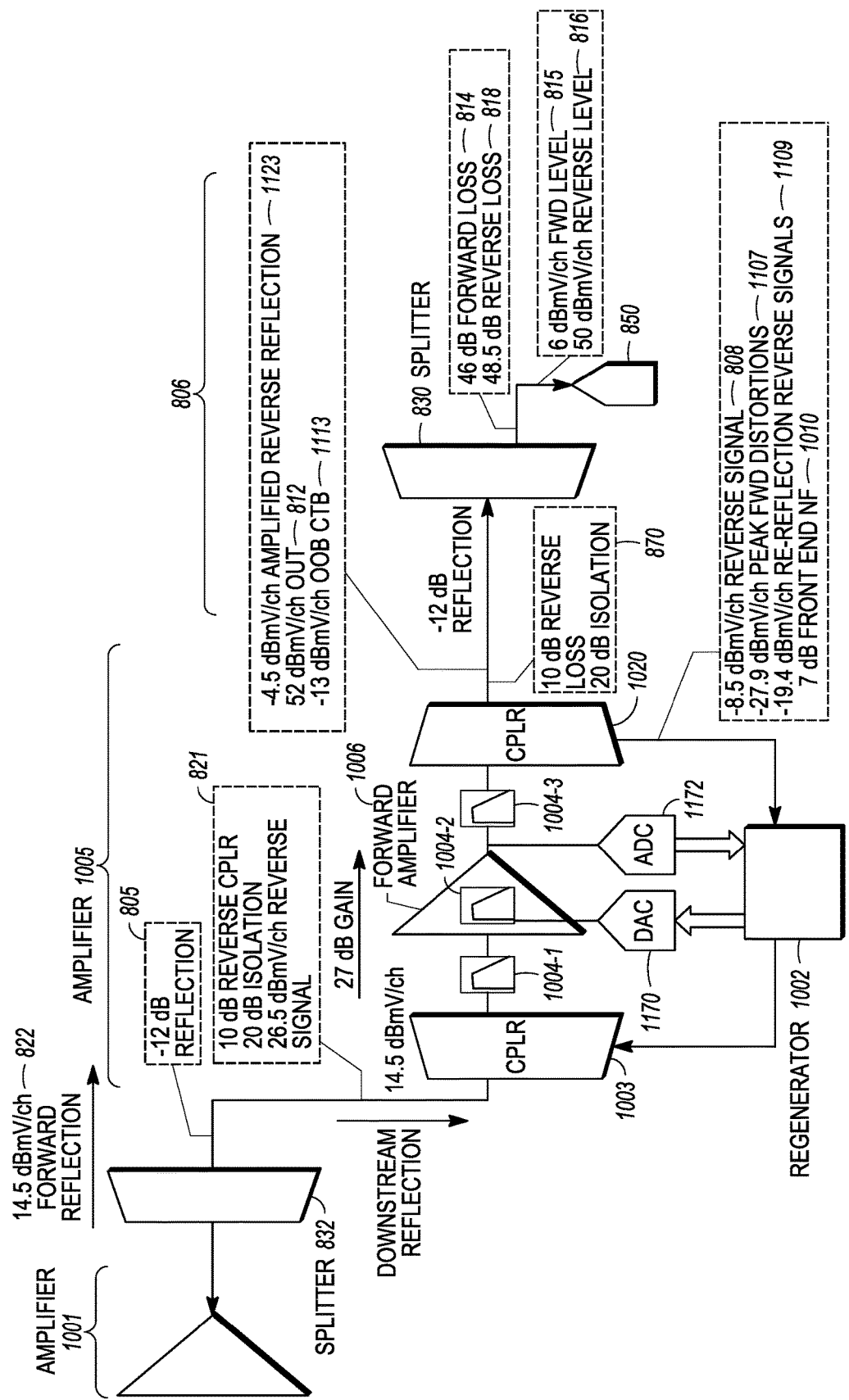
FIG. 11 depicts a return regenerator embodiment with active reflection and distortion cancellation according to one embodiment.

FIG. 11 depicts a return regenerator embodiment with active reflection and distortion cancellation according to one embodiment. FIG. 11 shows the same regenerator 1002 from FIG. 10 in amplifier 1005, but equipped with an Analog-to-Digital converter (ADC) 1172 that monitors the output of forward amplifier 1006 to measure amplifier output distortions and amplified reverse reflection signals and a DA converter (DAC) 1170 with one or more outputs that injects one or more signals into the forward amplifier 1006. The signal injection can be done-inter stage but also at the input coupler 1003 to the forward amplifier 1006. The ADC 270 and DAC 272 are used to suppress the effect of forward path reflections and distortions affecting the regenerator 1002 by at least 25 and 20 dB, respectively. Combined with a reduced output filter 1004-3 requirement of a mere 10 dB resulting in a degraded reflection level output of −13 dBmV/ch shown at 1113 compared to −23 dBmV/ch shown at 1013 and also degradation of distortions to −27.9 dBmV/ch shown at 1107 from −37.9 dBmV/ch shown at 1007, this still provides 39.4 dB effective SDR for the regenerator due to the digital SDR improvement of 20 dB. Herein effective means that the physical SDR into the regenerator may be worse than 39 dB (e.g., 19 dB in this example) but the regenerator 1002 recovers the signal to attain an SDR of greater than 39 dB after digital signal processing.

Relevant numbers that correspond to values described in FIG. 8 have been left in for illustrative purposes. It will be appreciated that other values may be used.

Furthermore the re-reflected signal is suppressed by active cancellation by at least 25 dB. Even at 35 dB inter-stage filter 1004-2 suppression, this results in a degraded reflection level output of −4.5 dBmV/ch shown at 1123, compared to −24.5 dBmV/ch shown at 1023 and a degraded re-reflected level of −19.4 dBmV/ch shown at 1109 compared to −39.4 dBmV/ch shown at 1009. A 36 dB SRR is obtained (for a mere 10 dB suppression by the output filter 1004-3) due to the digital SRR improvement of 25 dB, which implies that the usable frequency band between the amplifiers is further increased. The implementation permits processing with considerable latency, significantly more than the physical delay of signals through the amplifier and generally also more than a symbol time of the data format used. Adaptive control of distortion and reflection cancellation algorithms vary slowly with time.

The techniques disclosed herein for suppression include embodiments that rely on a novel use of the echo cancellation methods. For instance, OFDM is suitable for use with the disclosed techniques. As discussed above, two reflections may result. The first reflection may be from signals sent upstream by regenerator 1002. The second reflection may be from signals sent downstream by forward amplifier 1006.

For the first reflection, the regenerator 1002 knows what signal it is transmitting to the previous amplifier 1001, some of that signal is re-reflected and present at the output of the forward amplifier 1006. The ADC 1172 samples the output signal. Processing of the output of ADC 1172 then determines the overlap between the sampled signal and reverse transmitted signal per individual sub-band through digital signal processing. This is done by comparing signals sampled by ADC 1172 to signals put out by regenerator 1002 to coupler 1003, any correlation between these signals is indicative of a reflection being present in the signal and from the correlation, the reflection amplitude and phase can be determined. The symbol time may be (but need not be) chosen to be long enough (by choosing the sub-band width) such that it exceeds the reflection roundtrip time. Multiple reflections can lead to a complex frequency dependence of the reflection amplitude; however this frequency dependence is "smooth" within frequency ranges smaller than the reciprocal of the reflection round-trip time. For sufficiently small frequency bands, the reflection amplitude and phase can be approximated by a simple constant, and such frequency bands need to be narrower than the reciprocal of the longest reflection time. This permits a simple determination of the correlation. This correlation is consistent over time and will vary only slowly with the network condition.

The regenerator 1002 can thus readily predict reflections and it creates a correction signal that is added to the forward amplifier 1006 via DAC 1170 coupled into an input coupler 1003 or inter-stage at forward amplifier 1006 for each symbol that is sent in reverse direction. For example, DAC 1170 may also determine parameters to input into forward amplifier 1006 that adjust a correction signal for output by forward amplifier 1006. The correction signal amplitude and phase is adjusted to eliminate the reflection, which implies that the correction signal has cancelled the reflected signal that was present at the forward amplifier 1006. Thus the amplifier output of forward amplifier 1006 no longer carries this reflection signal. Furthermore, since ADC 1172 also monitors the amplifier output distortion, such parameters may be used to control elements in amplifier 1006 to reduce output distortion.

In one embodiment, the correction signal is a copy of the reflected signal that was sent in the reverse direction after application of an amplitude and phase response. This amplitude and phase response may be realized with a digital filter that mimics the properties of the reflection in the network by applying amplitude and phase for each frequency band that is used for transmission with values that are deduced from the reflection analysis. The properties of the filter (e.g., the coefficients) are adjusted over time to eliminate a correlation between the input and output of regenerator 1002. Depending on the modulation scheme that is implemented, the digital filter can be a conventional FIR (Finite Impulse Response) filter that acts on the complete reverse signal bandwidth or a fraction thereof. Alternately the digital filter is merely an amplitude, and optionally a phase-factor, that is applied per sub-band in the communication channel.

Figure 12:
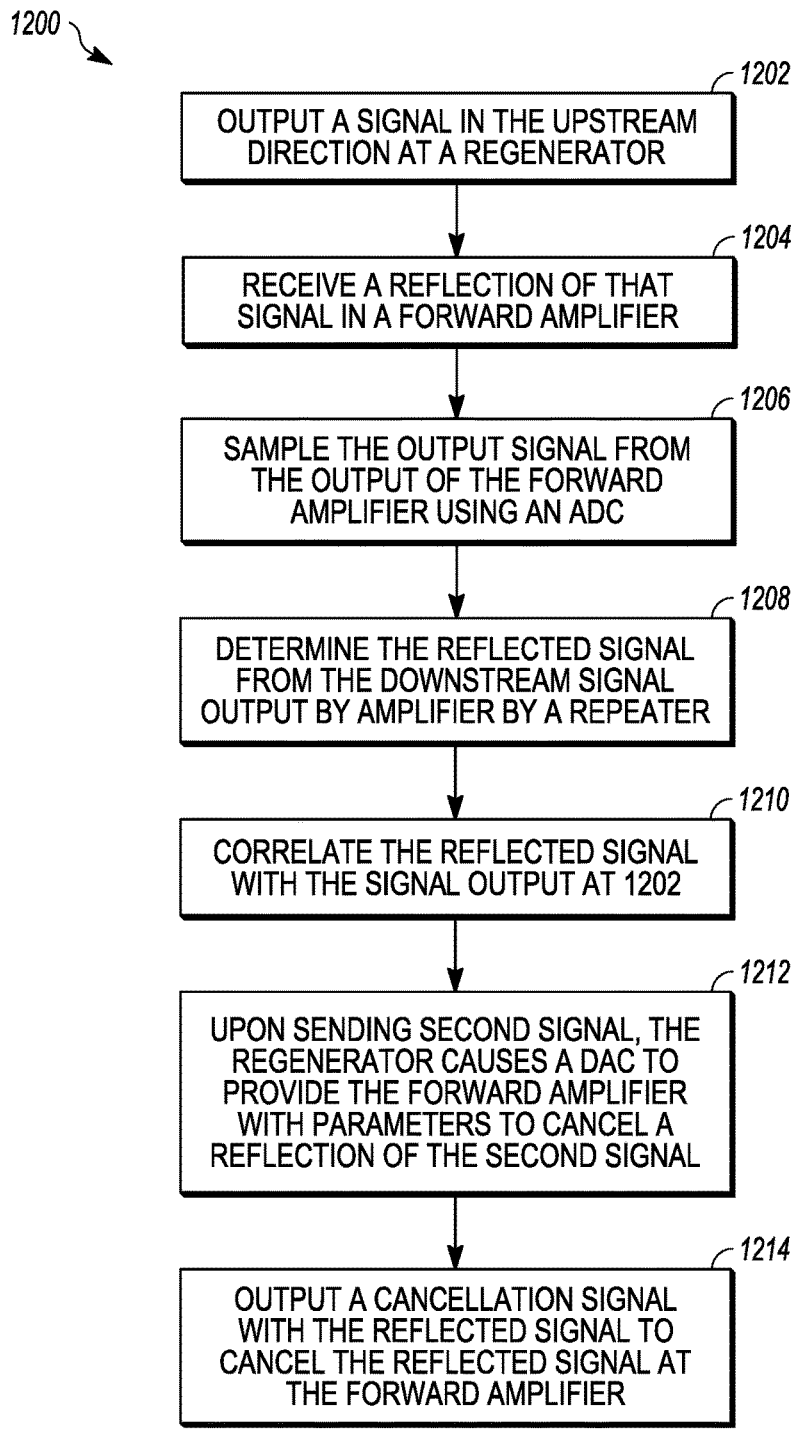
FIG. 12 depicts a simplified flowchart of a method for cancelling reflections from signals output by the regenerator.

FIG. 12 depicts a simplified flowchart 1200 of a method for cancelling reflections from signals output by regenerator 1002. In 1202, regenerator 1002 outputs a signal in the upstream direction. Thus, regenerator 1002 knows what signal it is transmitting to the previous amplifier 1001.

At 1204, forward amplifier 1006 receives a reflection of that signal. For discussion purposes, the system may configure itself by sampling the reflections to determine the correlation of the reflections such that they can be canceled. At 1206, ADC 1172 samples the output signal from the output of the forward amplifier 1006. In this case, the reflected signal has not been cancelled yet and is present in the output signal.

At 1208, regenerator 1002 then determines the reflected signal from the downstream signal output by amplifier 1004. That is, the downstream signal may include information sent from a headend towards home 850. At 1210, regenerator 1002 can correlate the reflected signal with the upstream signal output at 1202. This will permit regenerator 1002 to cancel subsequent signals that are sent. For example, this correlation is consistent over time and will vary only slowly with the network condition.

Thus, upon sending second signal, at 1212, regenerator 1002 causes DAC 1170 to provide amplifier 1006 with parameters to cancel a reflection of the second signal. Also, regenerator 1002 may monitor amplifier output distortion and then provide DAC 1170 with parameters that adjust amplifier settings to reduce the amplifier output distortion. Thus, the parameters may achieve both reflection cancellation and cancellation of amplifier output distortion. At 1214, amplifier 1006 outputs a cancellation signal with the reflected signal to cancel the reflected signal.

The regenerator 1002 can thus readily predict reflections and it creates a correction signal that is added to the forward amplifier 1006 via DAC 1170 and applied to an input coupler 1003 or inter-stage at forward amplifier 1006 for each symbol that is sent in reverse direction. For example, DAC 1170 may provide a correction signal to input into forward amplifier 1006 that is amplified and output by forward amplifier 1006. The correction signal amplitude and phase is adjusted to eliminate the reflection, which implies that the correction signal has cancelled the reflected signal that was present at the forward amplifier 1006. Thus the amplifier output of forward amplifier 1006 no longer carries this reflection signal.

For the second reflection of the reflection of amplifier 1006 output distortion to regenerator 1002, the amplifier output distortion is also sampled by the ADC 1172; this signal has no correlation to the regenerator activity and is thus noise-like. That is, the signal is not output by regenerator 1002. The ADC 1172 is deliberately located to sample the forward amplifier output (could also be behind the amplifier test point) where the return signal from the home 850 is weak compared to the amplifier output distortion level. This "noise like" signal is processed by the regenerator 1002 as if it was a valid OFDM signal. Within each sub-band symbols are determined and these symbols represent the errors that can have occurred due to reflected distortions mixing with intended reverse signals, wherein the actual reflection is not known. The regenerator 1002 compares the "error symbols" from the amplifier output into ADC 1172 to the input symbols from sampling the reverse path and determines the correlation between the "error symbols" and the reverse path symbols as seen at the input of regenerator 1002. This is done by correlating the samples from ADC 1172 to samples obtained from an ADC at the input of regenerator 1002. Without reflected distortions, these samples will be entirely uncorrelated. With reflection, a fraction of these samples are correlated and a correlation analysis is performed. Using digital signal processing, the correlation analysis is performed and thus a relation between the samples obtained from ADC 1172 that represent unwanted "error symbols or signals" and the input to amplifier 1005 is determined. This information is used to subtract the "error symbols" from the reverse path symbols that contain a fraction of these "error symbols", where the fraction was determined by the correlation analysis.

As a result, in embodiments, the regenerator input signal is corrected for the forward amplifier distortion and the forward filter requirement (filtering by filters 1004) is reduced. In fact, even without the forward filters 1004, a usable SDR can be obtained such that there no longer is a restriction on the upstream bandwidth from the home 850. This can now be allocated directly adjacent to the forward signal band. Furthermore, since the regenerator 1002 monitors the amplifier output it can adjust amplifier linearization parameters to suppress distortions (CTB, for example) in the narrow band of interest where it affects the reverse data communication. Thus, in one embodiment, an analog amplifier would have linearization means that are adjusted via additional parameter outputs on DAC 1170 by the regenerator 1002 that monitors the distortion output of the amplifier 1006.

The described embodiment may use narrowband ADCs and DACs that only cover the frequency range wherein information content, distortions, and reflection amplification are relevant; that is, the bandwidth is not much more than that required for information transfer. Such an embodiment anticipates that a full-band high performance ADC will still be relatively expensive. One auxiliary ADC and DAC are used for active echo cancellation at the output of each down-stream analog amplifier. On the other hand it is assumed that the silicon cost of physical layer digital signal processing of the OFDM signals and to perform echo cancellation is no longer an issue in current technology.

The concepts described herein may be compatible with existing amplifiers (i.e., a lid-upgrade and an inter stage filter change) Next, scenarios where the forward transmission bandwidth of the HFC amplifiers remains unchanged (e.g., 750 MHz) will be discussed.

Spectrum Allocation Examples

The use of bidirectional regenerators 1002 permits a quad-band spectrum allocation where the lower two bands are assigned to the traditional HFC frequency bands (for instance to 750 MHz) and the upper two bands for another modulation scheme such as OFDM. The first upper band will be in the return direction such that the above mentioned techniques can be used to eliminate the guard band. Placing this band at 750 MHz instead of 900 MHz reduces the amount of spectrum that requires echo cancellation by 15%. FIGS. 13A to 13C illustrate three embodiments representing spectrum allocation.

FIG. 13A represents a spectrum for a conventional top-split architecture with analog forward and reverse amplifiers and using a high-Q diplex filter design for the upper frequency band (only 100 MHz crossover region is assumed). The bands 1302 are not usable due to diplex filter crossovers. The bands 1304 are return bands with full performance characteristics. OFDM is used as an example modulation format.

FIG. 13B represents spectrum allocation using reverse regenerators including echo cancellation techniques according to one embodiment. In this spectrum, the OFDM forward band 1310 and return band 1312 bandwidths are expanded. For example, the forward band 1310 is from 750-890 MHz compared to 750-850 MHz resulting in 40 MHz of extra forward bandwidth. Also, the return band 1312 is from 920-1050 MHz compared to 950-1050 MHz resulting in an additional 30 MHz of extra return bandwidth. The spectrum adjacent to the forward band that is partially allocated to forward OFDM is also used for OFDM return at 1314 with the bps/Hz rate adjusted for the available quality of the echo and distortion cancellation. This provides an extra bandwidth from 890-920 MHz in the return band that was not used, except as a crossover region, allowing implementation of additional forward-to-return band isolation. As described herein, this band-limited filtering makes the 1310 OFDM forward and 1314 OFDM return spectrum practically realizable. Note that the reverse regenerators will generally permit a higher bps/Hz throughput than a conventional analog high frequency return system, as error correction will be applied at each regenerator; thus band 1314 may already have as much throughput in bps/Hz as an analog return link would have had. The analog return system counterpart would have suffered from noise addition of multiple amplifiers in the link, extra margin required for uncertainty of gain and losses and so-called noise funneling due to multiple many home connections in between amplifiers.

FIG. 13C represents spectrum allocation with a system with bi-directional regenerators according to one embodiment. The bidirectional portion of spectrum 1320 can be allocated dynamically, thus permitting far greater peak throughput. The return band 1322 can be used for reverse transmission only with the echo cancellation methods discussed herein. Given that the "crossover" is at a lower frequency (750 instead of 900 MHz), the area wherein the echo cancellation has to work hard is also reduced. That is, echo cancellation is needed in the 750-830 MHz band. Above this band, bidirectional regenerators can use (arbitrary portions of) the spectrum in either direction The same echo cancellation disclosed herein, may be harder to apply in the forward band (in that range where there still is residual amplifier gain) because it may require unrealistic processing speeds. Note that all echo cancellation methods discussed so far rely on a-priori knowledge of echoes that will occur, thus permitting processing delays. For this reason the lower part of the bidirectional band (for instance the lower 80 MHz) may only permit reverse transmission due to residual amplifier gain and distortions. In addition to 80 MHz OFDM return bandwidth this still leaves 220 MHz of bidirectional OFDM bandwidth.

The upper part of the spectrum can thus be half-duplex bidirectional with flexible frequency allocation. However in theory this spectrum can be used in a full-duplex mode by using the same echo cancellation methods to separate forward and reverse data streams with limited directivity in the system, this nearly doubles the available spectrum thus doubling data throughput. However practical limitations of the echo cancellation in the presence of very large level differences can be challenging and the modulation format may have to be set at a lower bps/Hz spectral efficiency that tolerates poorer signal to noise ratios. While that appears to be a drawback, it actually is a major advantage; a reduced bps/Hz efficiency implies a reduced SNR requirement on the link, thus the required transmission powers drop significantly. After all there is no point in attaining a high SNR in the light of limitations on reflection suppression. In a given slice of spectrum a full duplex link with a reduced bps/Hz efficiency (for instance 4 bps/Hz) requires far less power than a half-duplex link at high bps/Hz efficiency (for instance 8 bps/Hz) with identical throughput. This might be applied particularly between amplifiers where the loss (i.e., the forward/reverse signal level difference) is not as high as between an amplifier and the home. Hence one embodiment uses full duplex communication with the reflection cancellation methods described herein.

Combination with Wireless Transfer

The techniques discussed herein may be combined with wireless transfer. Embodiments include enabling a high capacity return data path without sacrificing forward bandwidth. The disclosed embodiments may provide greater data capacity via cable, however they may also be used for other purposes such as providing wireless services from amplifiers. In this case there need not be (although a combination is also possible) communication to homes in the high-frequency, very-high frequency, or ultra-high frequency bands; and higher, and even to optical frequencies. Such communication can be limited to communicating between the amplifiers, where each amplifier serves as a regenerator with both a wired and a wireless connection. Since the number of taps and the loss between amplifiers are limited, it is expected that the techniques described here will make sufficient symmetrical data capacity available to support a high-bit-rate wireless service operating from the amplifiers without the need to install additional fiber. Interestingly the wireless service itself can also provide data capacity by "hopping" from amplifier to amplifier (although that comes at a cost of average capacity) so that the wired and wireless data transfers can complement each other.

In one or more examples, the functions disclosed herein may be implemented in hardware, software, firmware, or any combination thereof. If implemented in software, the functions may be stored on or transmitted as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disc storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses. Various components, modules, or units are described in this disclosure to emphasize functional aspects of components configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:

receiving, by a computing device, at least one first signal for a user device at a first frequency in a downstream band, wherein the user device is operable to receive signals having frequencies within a frequency range allocated for an upstream band, and said first frequency is outside of said frequency range;

converting, by a converter in the computing device, the at least one first signal to at least one second signal at a second frequency, wherein said second frequency is within the frequency range allocated for the upstream band for receipt by the user device;

providing said at least one second signal output from the converter to a first coupler;

outputting, by the computing device, the at least one second signal at the second frequency in a downstream direction, the at least one second signal at the second frequency being sent in the upstream band in the downstream direction, wherein the output of said second signal in the downstream direction in the upstream band by the computer device causes reflections in an upstream direction towards the first coupler;

sampling an output of reflections, caused by the at least one second signal output in the downstream direction in the upstream band, from a second coupler in the upstream path that includes the first coupler, a return amplifier, and the second coupler;

in response to sampling the output of reflections from the second coupler in the upstream path, generating a cancellation signal for outputting to said first coupler in addition to one or more subsequent converted signals converted for the user device, whereby said cancellation signal is adjustable in amplitude and/or phase in response to the sampling of reflections output from the second coupler; and outputting the cancellation signal in the upstream path for canceling reflections caused by transmission of the at least one second signal output in the downstream direction in the upstream band.

2. The method of claim 1, further comprising:
monitoring previous reflections of previous second signals in an upstream direction; and
correlating the previous reflections of second signals to the previous second signals to allow the cancellation signal to be determined.

3. The method of claim 2, wherein an average delay and amplitude of the previous reflections of second signals are used to determine characteristics of the cancellation signal signal.

4. The method of claim 3, wherein the characteristics comprises an amplitude and a phase.

5. The method of claim 1, wherein the cancellation signal is output into a coupler for coupling upstream signals in the upstream band.

6. The method of claim 1, further comprising:
receiving a fourth signal for the user device in the downstream band;
amplifying the fourth signal at a forward amplifier; and
sending the amplified fourth signal in the downstream direction to the user device.

7. The method of claim 1, wherein:
the second signal is a control signal for the user device, and
the user device receives control signals at the second frequency and not at the first frequency.

8. The method of claim 1, wherein the second signal at the second frequency is received at a downstream computing device, and wherein the downstream computing device provides the second signal at the second frequency to the user device without frequency converting the second signal.

9. The method of claim 8, wherein:
the converter outputs the second signal at the second frequency for delivery to the user device,
the converter also determines the cancellation signal for the reflection of the second signal, and
outputs the cancellation signal to cancel the reflection of the second signal.

10. An apparatus comprising:
a first coupler for receiving at least one first signal for a user device, at a first frequency in a downstream band, wherein the user device is operable to receive signals having frequencies within a frequency range allocated for an upstream band, and said first frequency is outside of said frequency range; and
a converter for:
converting the at least one first frequency of the first signal to at least one second signal at a second frequency, wherein said second frequency is within the frequency range allocated for the upstream band for receipt by the user device;
sampling an output of reflections, caused by the at least one second signal output in the downstream direction in the upstream band, from a third coupler in the upstream path that includes a second coupler, a return amplifier, and the third coupler;
in response to sampling the output of reflections from the third coupler in the upstream path, generating a cancellation signal for outputting to said second coupler in addition to one or more subsequent converted signals converted for the user device,
whereby said cancellation signal is adjustable in amplitude and/or phase in response to the sampling of reflections output from the third coupler; and
an output for:
outputting, by the computing device, the at least one second signal at the second frequency in a downstream direction, the at least one second signal at the second frequency being sent in the upstream band in the downstream direction, wherein the output of said at least one second signal in the downstream direction in the upstream band by the computer device causes reflections in an upstream direction towards the third coupler; and
outputting the cancellation signal in the upstream path for canceling reflections caused by transmission of the at least one second signal output in the downstream direction in the upstream band.

11. The apparatus of claim 10, the apparatus further comprising:
a diplexer for receiving an additional signal, the additional signal having a frequency within the frequency range allocated for the upstream band and providing the additional signal to the third coupler for sending the additional signal in the downstream direction in the upstream band to the converter.

12. The apparatus of claim 11, further comprising:
a forward amplifier for amplifying the first signal in the downstream direction, wherein the second signal is not amplified by the forward amplifier.

13. The apparatus of claim 10, wherein:
the second signal is a control signal for the user device, and
the user device receives control signals at the second frequency and not at the first frequency.

14. The apparatus of claim 10, wherein the second coupler in the upstream band receives the reflection of the second signal and receives the cancellation signal, wherein the cancellation signal is for canceling reflections of the second signal at the first coupler.

15. The apparatus of claim 14 the apparatus further comprising:
the return amplifier for amplifying the reflection of the second signal and upstream signals; and
the third coupler for coupling the upstream signals upstream in the upstream band, wherein the converter monitors the reflection of the at least one second signal from the third coupler.

* * * * *